United States Patent
Tateno

(10) Patent No.: US 11,995,784 B2
(45) Date of Patent: May 28, 2024

(54) IMAGE PROCESSING DEVICE AND IMAGE PROCESSING METHOD

(71) Applicant: SONY GROUP CORPORATION, Tokyo (JP)

(72) Inventor: Hisayuki Tateno, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 158 days.

(21) Appl. No.: 17/602,526

(22) PCT Filed: Apr. 3, 2020

(86) PCT No.: PCT/JP2020/015259
§ 371 (c)(1),
(2) Date: Oct. 8, 2021

(87) PCT Pub. No.: WO2020/213426
PCT Pub. Date: Oct. 22, 2020

(65) Prior Publication Data
US 2022/0172447 A1 Jun. 2, 2022

(30) Foreign Application Priority Data
Apr. 18, 2019 (JP) ................................. 2019-079283

(51) Int. Cl.
*G06T 19/20* (2011.01)
*H04N 13/204* (2018.01)
*H04N 13/275* (2018.01)

(52) U.S. Cl.
CPC ........... *G06T 19/20* (2013.01); *H04N 13/204* (2018.05); *H04N 13/275* (2018.05); *G06T 2200/24* (2013.01)

(58) Field of Classification Search
None
See application file for complete search history.

(56) References Cited

U.S. PATENT DOCUMENTS 6,665,342 B1 * 12/2003 Brown ............. G08B 13/19691
348/E5.065
2003/0085992 A1 * 5/2003 Arpa ..................... G06T 15/205
348/E7.086
(Continued)

FOREIGN PATENT DOCUMENTS

CN 109565605 A 4/2019
CN 109716751 A 5/2019
(Continued)

OTHER PUBLICATIONS

Rajvi Shah, P. J. Narayanan, "Interactive Video Manipulation Using Object Trajectories and Scene Backgrounds", Feb. 25, 2013, IEEE, IEEE Transactions on Circuits and Systems for Video Technology, vol. 23, Issue 9, pp. 1565-1576.*
(Continued)

*Primary Examiner* — Robert Bader
(74) *Attorney, Agent, or Firm* — CHIP LAW GROUP

(57) ABSTRACT

An image processing device and an image processing method for easy editing of a free viewpoint image. The image processing device displays a 3D stroboscopic image obtained by imaging, with a virtual camera, a stroboscopic model in which 3D models of an object at a plurality of times generated from a plurality of viewpoint images imaged from a plurality of viewpoints are arranged in a three-dimensional space, and displays an editing parameter to be edited in editing of a free viewpoint image obtained by imaging, with the virtual camera, free viewpoint data generated from the plurality of viewpoint images, the editing parameter being linked with the 3D stroboscopic image.

12 Claims, 20 Drawing Sheets

(56) References Cited

U.S. PATENT DOCUMENTS

| | | | | |
|---|---|---|---|---|
| 2004/0017504 | A1* | 1/2004 | Prandoni | H04N 7/188 348/370 |
| 2006/0262184 | A1* | 11/2006 | Peleg | G06T 13/80 348/36 |
| 2009/0219300 | A1* | 9/2009 | Peleg | G11B 27/034 345/630 |
| 2010/0039447 | A1* | 2/2010 | Nakao | G06T 11/60 345/473 |
| 2019/0174109 | A1 | 6/2019 | Yoshikawa et al. | |
| 2019/0213791 | A1 | 7/2019 | Hanamoto et al. | |
| 2019/0378279 | A1* | 12/2019 | Hirakawa | G06T 7/20 |

FOREIGN PATENT DOCUMENTS

| | | |
|---|---|---|
| EP | 3499897 A1 | 6/2019 |
| JP | 10-172009 A | 6/1998 |
| JP | 2007-259477 A | 10/2007 |
| JP | 2018-046448 A | 3/2018 |
| JP | 2019-153863 A | 9/2019 |
| KR | 10-2019-0039774 A | 4/2019 |
| WO | 2018/030206 A1 | 2/2018 |
| WO | 2018/051688 A1 | 3/2018 |
| WO | 2019/167300 A1 | 9/2019 |

OTHER PUBLICATIONS

Xiuming Zhang, Tali Dekel, Tianfan Xue, Andrew Owens, Qiurui He, Jiajun Wu, Stefanie Mueller, William T. Freeman, "MoSculp: Interactive Visualization of Shape and Time", Oct. 17, 2018, ACM, UIST '18: Proceedings of the 31st Annual ACM Symposium on User Interface Software and Technology, pp. 275-285.*

Rajvi Shah, P. J. Narayanan, "Trajectory Based Video Object Manipulation", Jul. 2011, IEEE, 2011 IEEE International Conference on Multimedia and Expo.*

Kuno Kurzhals, Daniel Weiskopf, "Space-Time Visual Analytics of Eye-Tracking Data for Dynamic Stimuli", Oct. 16, 2013, IEEE, IEEE Transactions on Visualization and Computer Graphics, vol. 19, Issue 12, pp. 2129-2138.*

Shao-Ping Lu, Song-Hai Zhang, Jin Wei, Shi-Min Hu, Ralph R. Martin, "Timeline Editing of Objects in Video", Jun. 26, 2013, IEEE, IEEE Transactions on Visualization and Computer Graphics, vol. 19, Issue 7, pp. 1218-1227.*

B. Bach, P. Dragicevic, D. Archambault, C. Hurter, S. Carpendale, "A Descriptive Framework for Temporal Data Visualizations Based on Generalized Space-Time Cubes", Apr. 14, 2016, Wiley, Computer Graphics Forum, vol. 36, No. 6, pp. 36-61.*

International Search Report and Written Opinion of PCT Application No. PCT/JP2020/015259, dated Jun. 9, 2020, 09 pages of ISRWO.

* cited by examiner

IMAGE PROCESSING DEVICE AND IMAGE PROCESSING METHOD

CROSS REFERENCE TO RELATED APPLICATIONS

This application is a U.S. National Phase of International Patent Application No. PCT/JP2020/015259 filed on Apr. 3, 2020, which claims priority benefit of Japanese Patent Application No. JP 2019-079283 filed in the Japan Patent Office on Apr. 18, 2019. Each of the above-referenced applications is hereby incorporated herein by reference in its entirety.

TECHNICAL FIELD

The present technology relates to an image processing device, an image processing method, and a program, and particularly relates to an image processing device, an image processing method, and a program that enable, for example, easy editing of a free viewpoint image.

BACKGROUND ART

A method for generating a stroboscopic image reflecting an object (subject) imaged at a plurality of times has been devised (see, for example, Patent Document 1). Since the stroboscopic image reflects the object at the plurality of times, a movement and a locus of the object can be easily grasped.

CITATION LIST

Patent Document

Patent Document 1: Japanese Patent Application Laid-Open No. 2007-259477

SUMMARY OF THE INVENTION

Problems to be Solved by the Invention

Meanwhile, in recent years, a free viewpoint image in which an appearance when a three-dimensional space is viewed from a virtual viewpoint is reproduced has attracted attention.

Since content of the free viewpoint image has a high degree of freedom, it is expected that editing (work) becomes difficult.

The present technology has been made in view of such a situation, and enables easy editing of a free viewpoint image.

Solutions to Problems

An image processing device or a program of the present technology is an image processing device including a display control unit that displays: a 3D stroboscopic image obtained by imaging, with a virtual camera, a stroboscopic model in which 3D models of an object at a plurality of times generated from a plurality of viewpoint images imaged from a plurality of viewpoints are arranged in a three-dimensional space; and an editing parameter to be edited in editing of a free viewpoint image obtained by imaging, with the virtual camera, free viewpoint data generated from the plurality of viewpoint images, the editing parameter being linked with the 3D stroboscopic image, or a program for causing a computer to function as such an image processing device.

An image processing method of the present technology is an image processing method including displaying: a 3D stroboscopic image obtained by imaging, with a virtual camera, a stroboscopic model in which 3D models of an object at a plurality of times generated from a plurality of viewpoint images imaged from a plurality of viewpoints are arranged in a three-dimensional space; and an editing parameter to be edited in editing of a free viewpoint image obtained by imaging, with the virtual camera, free viewpoint data generated from the plurality of viewpoint images, the editing parameter being linked with the 3D stroboscopic image.

In the present technology, displayed is: a 3D stroboscopic image obtained by imaging, with a virtual camera, a stroboscopic model in which 3D models of an object at a plurality of times generated from a plurality of viewpoint images imaged from a plurality of viewpoints are arranged in a three-dimensional space; and an editing parameter to be edited in editing of a free viewpoint image obtained by imaging, with the virtual camera, free viewpoint data generated from the plurality of viewpoint images, the editing parameter being linked with the 3D stroboscopic image.

Note that, the image processing device may be an independent device or an internal block included in one device.

Furthermore, the program can be provided by being transmitted via a transmission medium or by being recorded on a recording medium.

MODE FOR CARRYING OUT THE INVENTION

<Embodiment of Image Processing System to which Present Technology is Applied>

Figure 1:
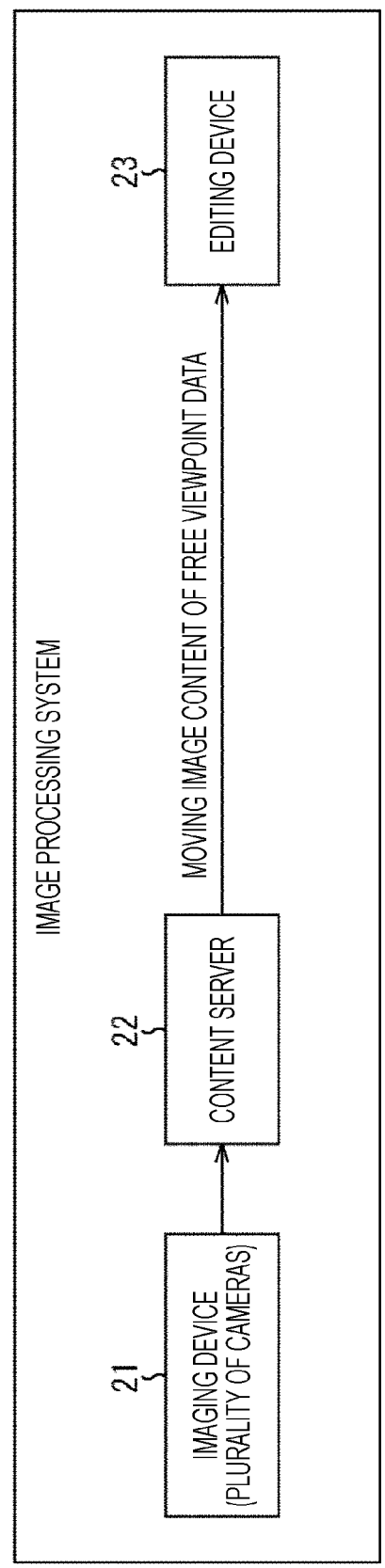
FIG. 1 is a block diagram illustrating a configuration example of an embodiment of an image processing system to which the present technology is applied.

FIG. 1 is a block diagram illustrating a configuration example of an embodiment of an image processing system to which the present technology is applied.

The image processing system in FIG. 1 includes an imaging device 21, a content server 22, and an editing device 23.

The imaging device 21 includes at least a plurality of cameras, and performs imaging of an object from a plurality of viewpoints. For example, the plurality of cameras constituting the imaging device 21 is arranged to surround an object, and each camera images the object from a viewpoint as a position where the camera is arranged. A 2D image imaged by each camera from a position of the camera, that is, (moving images of) viewpoint images of a plurality of viewpoints, which are 2D images imaged from a plurality of viewpoints, are supplied from the imaging device 21 to the content server 22 on a frame-by-frame basis.

Here, the imaging device 21 can be provided with a plurality of distance measuring devices in addition to the plurality of cameras. The distance measuring devices can be arranged at the same positions (viewpoints) as the cameras, or can be arranged at positions different from the cameras. Each of the distance measuring devices measures a distance from a position (viewpoint) where the distance measuring device is arranged to the object, and generates a depth image that is a 2D image having a depth that is information regarding the distance as a pixel value. The depth image is supplied from the imaging device 21 to the content server 22.

Note that, in a case where the imaging device 21 is provided with no distance measuring device, the distance to the object can be measured by the principle of triangulation by using viewpoint images of two viewpoints among the viewpoint images of the plurality of viewpoints, and the depth image can be generated.

The content server 22 is, for example, a web server or a server on a cloud. The content server 22 generates a content (moving image content) of free viewpoint data by using, for example, the viewpoint images of the plurality of viewpoints supplied from the imaging device 21, and the like. The content server 22 transmits the content of the free viewpoint data to the editing device 23 in response to a request from the editing device 23.

The editing device 23 requests and acquires the content of the free viewpoint data from the content server 22. The editing device 23 reproduces the content of the free viewpoint data acquired from the content server 22. That is, the editing device 23 generates and displays a 2D image as a free viewpoint image obtained by imaging the free viewpoint data with the virtual camera.

Furthermore, the editing device 23 generates and displays an editing screen used for editing the free viewpoint image. A user can edit the free viewpoint image by using the editing screen.

The free viewpoint data is data expressing a three-dimensional structure of a three-dimensional space, and with the free viewpoint data, it is possible to generate an image viewed when an object that is a subject in the three-dimensional space is viewed from a predetermined viewpoint, that is, a 2D image obtained by projecting a viewing volume (or a view volume) in the three-dimensional space expressed by the free viewpoint data on a projection plane perpendicular to a line-of-sight direction when the object is viewed from a predetermined viewpoint. Since the 2D image can be generated by freely setting the viewpoint, it can be referred to as a free viewpoint image. Since the viewpoint (including the line-of-sight (direction)) necessary for generation of the free viewpoint image can be virtually set regardless of an actual viewpoint of the user, such a viewpoint is also referred to as a virtual viewpoint.

The free viewpoint image (moving image) can be displayed on a two-dimensional planar display such as a monitor of a PC or a smartphone.

Furthermore, the free viewpoint image can be displayed on a head mounted display (HMD). In this case, it is possible to implement stereoscopic vision viewed as if the object existed in a three-dimensional space by a head tracking technology.

Moreover, the free viewpoint image can be displayed on a head-up display (HUD) using a transparent display through which the further side can be seen, such as augmented reality (AR) glasses. In this case, in a three-dimensional space where the user actually exists, an object such as a person or a material body imaged in another three-dimensional space can be superimposed and displayed.

Similarly to the 2D image, (the free viewpoint image expressed by) the free viewpoint data has not only a degree of freedom in the time direction but also a degree of freedom in an imaging position and an imaging posture (imaging direction) of the virtual camera that images (the three-dimensional space expressed by) the virtual viewpoint, that is, the free viewpoint data. The imaging position of the virtual camera can be represented by, for example, coordinates of an xyz coordinate system as a world coordinate system, and the like, and the imaging posture of the virtual camera can be represented by a rotation angle around each axis of the world coordinate system, and the like. Since the imaging position of the virtual camera can be moved in the x-axis, y-axis, and z-axis directions, and the imaging posture of the virtual camera can be rotated around the x-axis, y-axis, and z-axis, the imaging position and the imaging posture of the virtual camera have a degree of freedom of 6 Degree of Freedom (6 DoF). Thus, the free viewpoint data has a total of seven degrees of freedom including one degree of freedom in the time direction and six degrees of freedom of the imaging position and the imaging posture (virtual viewpoint) of the virtual camera.

Here, as the free viewpoint image generated by projecting (the viewing volume in the three-dimensional space expressed by) the free viewpoint data on the projection plane for the virtual viewpoint, it is possible to obtain a 2D image viewed as if imaging of the free viewpoint data were performed with the virtual camera from the virtual viewpoint. Thus, it can be said that projecting the free viewpoint data on the projection plane for the virtual viewpoint corresponds to imaging the free viewpoint data with the virtual camera from the virtual viewpoint. That is, projecting the free viewpoint data on the projection plane for the virtual viewpoint to generate the free viewpoint image can be regarded as imaging the free viewpoint data with the virtual camera arranged at the virtual viewpoint. Thus, in the present embodiment, the generation of the free viewpoint image is regarded as the imaging of the free viewpoint data with the virtual camera, and the description will be appropriately made. Furthermore, a virtual camera that images free viewpoint data is also referred to as a virtual camera.

The imaging position and the imaging posture of the virtual camera can be set by the user operating a controller (device) that controls positions and postures, such as a joystick and others.

Furthermore, in a case where the HMD or the HUD is used to view the free viewpoint data, the imaging position and the imaging posture of the virtual camera can be set to correspond to the viewpoint and the line-of-sight (direction) of the user detected by the HMD or the HUD.

Note that, the content server 22 and the editing device 23 can be configured as separate devices as illustrated in FIG. 1, or can be configured as a single device (for example, a personal computer (PC) or the like) as a whole. Moreover, the entire content server 22 can include a plurality of devices. The same applies to the editing device 23.

<Configuration Example of Content Server 22>

Figure 2:
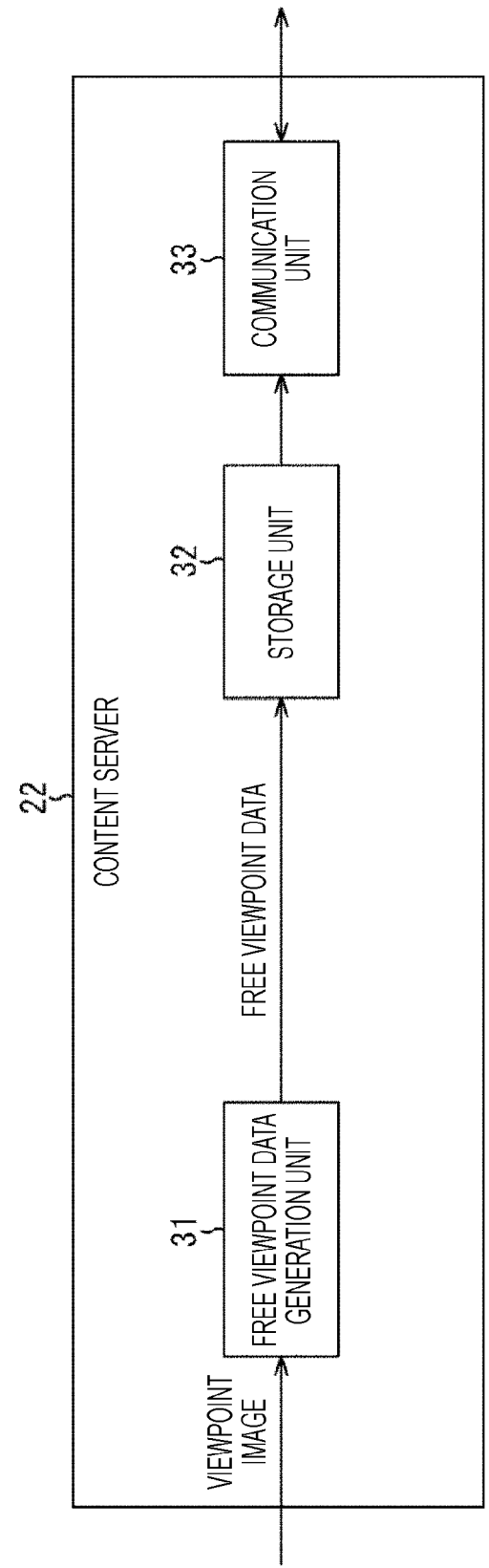
FIG. 2 is a block diagram illustrating a configuration example of a content server 22.

FIG. 2 is a block diagram illustrating a configuration example of the content server 22 in FIG. 1.

The content server 22 includes a free viewpoint data generation unit 31, a storage unit 32, and a communication unit 33.

The free viewpoint data generation unit 31 generates free viewpoint data on a frame-by-frame basis from the viewpoint images and depth images of the plurality of viewpoints from the imaging device 21, thereby generating content of the free viewpoint data.

Here, the free viewpoint data broadly means data (3D data) of a 3D image from which a free viewpoint image can be generated. As the free viewpoint data, for example, a set of the viewpoint images and the depth images of the plurality of viewpoints from the imaging device 21 can be adopted as it is. Furthermore, as the free viewpoint data, in addition, for example, 3D data including a 3D shape model that is three-dimensional shape information, and color information, or a set of the 2D images and the depth images of the plurality of viewpoints can be adopted.

In a case where the set of the viewpoint images and the depth images of the plurality of viewpoints from the imaging device 21 is adopted as the free viewpoint data, the free viewpoint data generation unit 31 sets the set of the viewpoint images and the depth images of the plurality of viewpoints from the imaging device 21 as the free viewpoint data as it is. Note that, in a case where the viewpoint of the depth image from the imaging device 21 is different from the viewpoint of the viewpoint image from the imaging device 21, the free viewpoint data generation unit 31 can generate a depth image of the viewpoint of the viewpoint image from the imaging device 21 by using the depth images of the plurality of viewpoints from the imaging device 21.

In a case where the 3D data including the 3D shape model and the color information is adopted as the free viewpoint data, the free viewpoint data generation unit 31 performs modeling by a visual hull or the like using the viewpoint images of the plurality of viewpoints from the imaging device 21, generates a 3D shape model and the like of the object reflected in the viewpoint images, and sets the 3D shape model and the like as the free viewpoint data together with the viewpoint images of the plurality of viewpoints serving as a texture.

In a case where the set of the 2D images and the depth images of the plurality of viewpoints is adopted as the free viewpoint data, the free viewpoint data generation unit 31 generates, for example, as described above, the 3D data including the 3D shape model and color information, and generates the set of the 2D images and the depth images obtained by viewing the 3D data from a plurality of viewpoints (the viewpoints may be the same as or different from the viewpoints of the cameras constituting the imaging device 21) as the free viewpoint data.

The free viewpoint data generation unit 31 generates the content of the free viewpoint data as described above, and supplies the content to the storage unit 32.

Note that, an amount of data of the free viewpoint data can be reduced by adopting, as the free viewpoint data, the set of the 2D images and the depth images of the plurality of viewpoints as compared with the 3D data including the 3D shape model. A technique for generating and transmitting the set of the 2D images and the depth images of the plurality of viewpoints as free viewpoint data is described in International Publication No. 2017/082076 previously devised by the present applicant. The set of the 2D images and the depth images of the plurality of viewpoints as the free viewpoint data can be encoded by an encoding method for 2D images, for example, multiview and depth video coding (MVCD), advanced video coding (AVC), high efficiency video coding (HEVC), or the like.

Furthermore, (an expression format of) the free viewpoint data includes a 3D model called View Independent (hereinafter, also referred to as VI model) and a 3D model called View Dependent (hereinafter, also referred to as a VD model).

The VD model is, for example, 3D data in which information regarding a three-dimensional shape such as a 3D shape model and information of an image serving as a texture are separated from each other. In the VD model, the image serving as the texture is mapped (texture mapping) on the 3D shape model, whereby a color is given. With the VD model, it is possible to express a degree of reflection or the like of a surface of an object that differs depending on a (virtual) viewpoint. The VD model is called View Dependent because the appearance depends on the viewpoint.

The VI model is, for example, 3D data or the like in which polygons or points as constituents of information regarding a three-dimensional shape have color information. Examples of the VI model include a colored point cloud, and a set of a 3D shape model and a UV map as color information of the 3D shape model. With the VI model, colors of polygons or points are observed from any (virtual) viewpoint. The VI model is called View Independent because the appearance is independent of the viewpoint.

The storage unit 32 stores the content of the free viewpoint data from the free viewpoint data generation unit 31.

The communication unit 33 communicates with the editing device 23. That is, the communication unit 33 transmits the content of the free viewpoint data stored in the storage unit 32 to the editing device 23 in response to a request from the editing device 23, for example.

Note that, the free viewpoint data generation unit 31 can be provided in the editing device 23. In this case, in the image processing system in FIG. 1, the content server 22 is unnecessary.

<Configuration Example of Editing Device 23>

Figure 3:
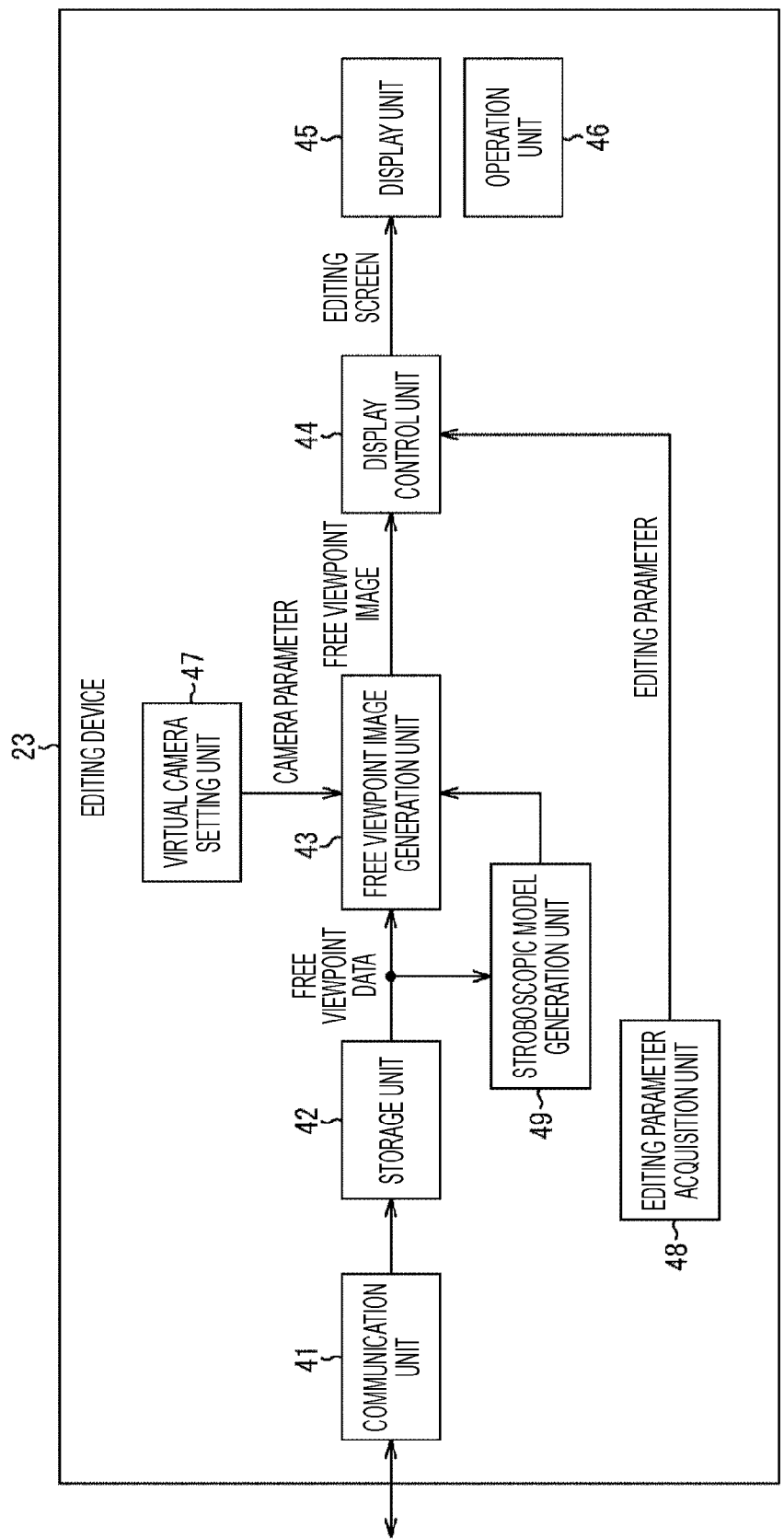
FIG. 3 is a block diagram illustrating a configuration example of an editing device 23.

FIG. 3 is a block diagram illustrating a configuration example of the editing device 23 in FIG. 1.

The editing device 23 includes a communication unit 41, a storage unit 42, a free viewpoint image generation unit 43, a display control unit 44, a display unit 45, an operation unit 46, a virtual camera setting unit 47, an editing parameter acquisition unit 48, and a stroboscopic model generation unit 49.

The communication unit 41 communicates with the content server 22. That is, the communication unit 41 transmits a request for the content of the free viewpoint data in accordance with operation on the operation unit 46, for example. Furthermore, the communication unit 41 receives the content of the free viewpoint data transmitted from the content server 22 in response to the request, and supplies the content to the storage unit 42.

The storage unit 42 stores the content of the free viewpoint data from the communication unit 41.

The free viewpoint image generation unit 43 generates (renders), as (data of) a free viewpoint image, a 2D image (a 2D image obtained by imaging with the virtual camera) (including a set of a 2D image for the left eye and a 2D image for the right eye) or the like obtained by imaging (the three-dimensional space expressed by) the free viewpoint data stored in the storage unit 42 with the virtual camera (in a state) represented by a camera parameter supplied from the virtual camera setting unit 47, and supplies the free viewpoint image to the display control unit 44.

Furthermore, the free viewpoint image generation unit 43 generates a 3D stroboscopic image that is a free viewpoint image of a 2D image obtained by imaging a stroboscopic model (free viewpoint data) supplied from the stroboscopic model generation unit 49 with the virtual camera having the camera parameters supplied from the virtual camera setting unit 47, and supplies the 3D stroboscopic image to the display control unit 44.

Here, the stroboscopic model is a model in which 3D models of the same object (subject) in a plurality of frames (times) of viewpoint images are arranged in (a 3D model of) an imaging space as a three-dimensional space imaged by the imaging device 21, and can be generated by using free viewpoint data.

The display control unit 44 performs display control to display an image on the display unit 45. For example, the display control unit 44 supplies the free viewpoint image supplied from the free viewpoint image generation unit 43 to the display unit 45 for display. Furthermore, the display control unit 44 generates an editing screen including (display of) the free viewpoint image as the 3D stroboscopic image supplied from the free viewpoint image generation unit 43 and an animation curve that is supplied from the editing parameter acquisition unit 48 and is a temporal change of an editing parameter linked with the 3D stroboscopic image, and supplies the editing screen to the display unit 45 for display.

The display unit 45 displays the free viewpoint image, the editing screen, and the like in accordance with the display control of the display control unit 44.

The display unit 45 can include, for example, a 2D HMD/HUD, a 2D monitor, a 3D HMD/HUD, a 3D monitor, or the like. The 3D HMD/HUD or monitor is, for example, a display device that implements stereoscopic vision by displaying a 2D image for the left eye and a 2D image for the right eye.

The operation unit 46 is operated by the user and supplies operation information corresponding to the user's operation to a necessary block. Note that, the operation unit 46 can be integrally configured with the display unit 45 by, for example, a touch panel or the like. Furthermore, the operation unit 46 can also be configured as a mouse, a controller, or the like separate from the display unit 45. As the operation on the operation unit 46 by the user, for example, operation of setting (the camera parameter of) the virtual camera, operation on the editing screen, or the like can be performed.

The virtual camera setting unit 47 sets the free viewpoint data, that is, the free viewpoint data stored in the storage unit 42, and the camera parameter when the stroboscopic model generated by the stroboscopic model generation unit 49 is imaged by the virtual camera, and supplies them to the free viewpoint image generation unit 43.

For example, the virtual camera setting unit 47 sets camera parameters of the virtual camera, such as an imaging position, an imaging posture, an angle of view (focal length), and a zoom magnification of the virtual camera in accordance with a user's operation.

Here, in a case where the display unit 45 is, for example, an HMD or an HUD, the virtual camera setting unit 47 can set the imaging position and the imaging posture of the virtual camera to correspond to the viewpoint and the line of sight of the user depending on the viewpoint and the line of sight of the user detected by the HMD or the HUD.

Furthermore, in a case where the editing device 23 is a mobile terminal such as a smartphone or a tablet, for example, the imaging position and the imaging posture of the virtual camera can be set to correspond to the position and the posture of the mobile terminal depending on the position and the posture of the mobile terminal.

From the free viewpoint data stored in the storage unit 42, the camera parameters set by the virtual camera setting unit 47, and the like, the editing parameter acquisition unit 48 acquires, as editing parameters, information to be edited in editing of the free viewpoint image, such as a position and others of the 3D model of the object, and supplies the acquired information to the display control unit 44.

Using the free viewpoint data stored in the storage unit 42, the stroboscopic model generation unit 49 generates a stroboscopic model in which 3D models that are free viewpoint data of the same object in a plurality of frames (different times) of the viewpoint image are arranged in (the 3D model of) the three-dimensional space reflected in the viewpoint image.

That is, the stroboscopic model generation unit 49 selects a frame (hereinafter, also referred to as a generation frame) to be used for generation of the stroboscopic model from frames in a stroboscopic section that is a section of frames for which the stroboscopic model is to be generated. Moreover, the stroboscopic model generation unit 49 sets one or more objects among objects reflected in the generation frame as objects (hereinafter, also referred to as target objects) whose 3D models are to be arranged in the stroboscopic model. Then, the stroboscopic model generation unit 49 generates a stroboscopic model in which the 3D models of the target objects reflected in the generation frame are arranged, and supplies the stroboscopic model to the free viewpoint image generation unit 43.

Note that, in the stroboscopic model generation unit 49, for example, all moving objects reflected in the generation frame can be set as target objects. Furthermore, the stroboscopic model generation unit 49 can set, for example, an object specified by the user of the editing device 23 among the objects reflected in the generation frame as the target object.

When the stroboscopic model is supplied from the stroboscopic model generation unit 49, the free viewpoint image generation unit 43 generates a 3D stroboscopic image that is a free viewpoint image obtained by imaging the stroboscopic model with the virtual camera having the camera parameters supplied from the virtual camera setting unit 47, and supplies the 3D stroboscopic image to the display control unit 44.

Here, the stroboscopic image is an image in which one or more identical objects (images) imaged at a plurality of times are reflected. When a stroboscopic image using an object reflected in a 2D image as it is is referred to as a 2D stroboscopic image, the 3D stroboscopic image is a stroboscopic image obtained by imaging the 3D model of the object, that is, a stroboscopic image in which the stroboscopic model is viewed from the virtual viewpoint, and is different from the 2D stroboscopic image.

Furthermore, the editing device 23 only needs to have at least a function of communicating with the outside, a function of displaying an image, and a function of receiving user's operation. In FIG. 3, other functions, for example, functions implemented by the free viewpoint image generation unit 43, the display control unit 44, the virtual camera setting unit 47, the editing parameter acquisition unit 48, and the stroboscopic model generation unit 49 can be provided in, for example, the content server 22 or a server on a cloud.

<Processing of Editing Device 23>

Figure 4:
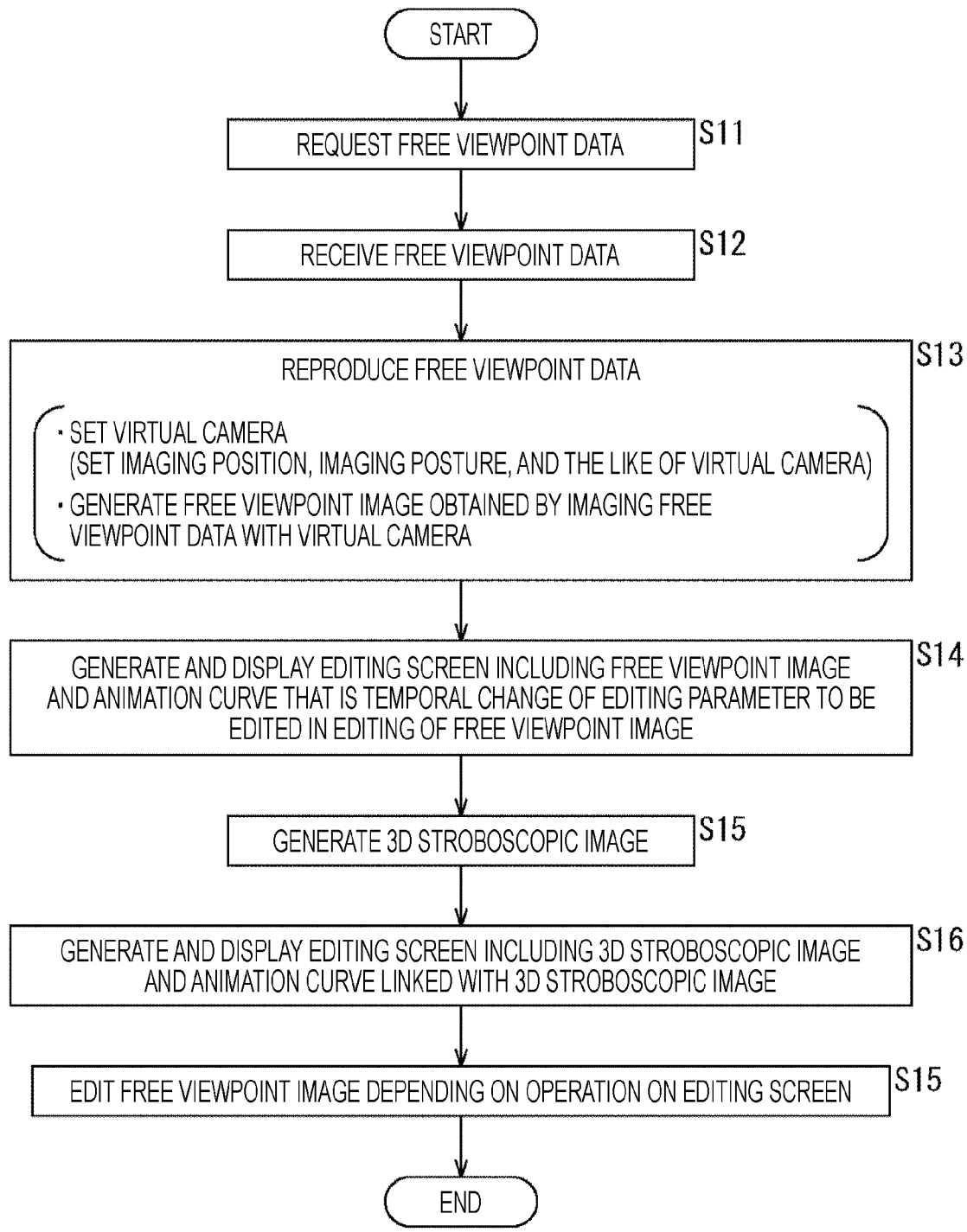
FIG. 4 is a flowchart illustrating an example of editing processing performed by the editing device 23.

FIG. 4 is a flowchart illustrating an example of free viewpoint image editing processing performed by the editing device 23 in FIG. 3.

In step S11, the communication unit 41 requests the content server 22 for the content of the free viewpoint data, for example, in accordance with the user's operation, and the processing proceeds to step S12.

In step S12, the communication unit 41 waits for the content of the free viewpoint data to be transmitted from the content server 22, and receives the content of the free viewpoint data. The communication unit 41 supplies the content of the free viewpoint data from the content server 22 to the storage unit 42 for storage, and the processing proceeds from step S12 to step S13.

In step S13, the editing device 23 reproduces the content of the free viewpoint data stored in the storage unit 42, and the processing proceeds to step S14.

That is, in the editing device 23, the virtual camera setting unit 47 sets the camera parameters of the virtual camera, and the free viewpoint image generation unit 43 generates, by rendering, the free viewpoint image obtained by imaging the free viewpoint data with the virtual camera having the camera parameters set by the virtual camera setting unit 47, and supplies the free viewpoint image to the display control unit 44.

In step S14, the display control unit 44 uses the editing parameters acquired by the editing parameter acquisition unit 48 to generate an animation curve that is a temporal change in the editing parameters to be edited in editing of the free viewpoint image. Moreover, the display control unit 44 generates an editing screen including (display of) the free viewpoint image from the free viewpoint image generation unit 43 and the animation curve. Then, the display control unit 44 supplies the editing screen to the display unit 45 for display, and the processing proceeds from step S14 to step S15.

In step S15, for example, waiting is performed for the user to perform operation to request display of the 3D stroboscopic image, regarding the object (subject) reflected in the free viewpoint image constituting the editing screen displayed in step S14, and then the 3D stroboscopic image is generated.

That is, in step S15, the stroboscopic model generation unit 49 generates the stroboscopic model in which the 3D models of the target object reflected in the plurality of frames of the viewpoint image are arranged with any of the objects reflected in the free viewpoint image constituting the editing screen as the target object, and supplies the stroboscopic model to the free viewpoint image generation unit 43. The free viewpoint image generation unit 43 generates a 3D stroboscopic image that is a free viewpoint image obtained by imaging the stroboscopic model from the stroboscopic model generation unit 49 with the virtual camera. Then, the free viewpoint image generation unit 43 supplies the 3D stroboscopic image to the display control unit 44, and the processing proceeds from step S15 to step S16.

In step S16, the display control unit 44 uses the editing parameters acquired by the editing parameter acquisition unit 48 to generate an animation curve that is a temporal change in the editing parameters linked with the 3D stroboscopic image from the free viewpoint image generation unit 43. Moreover, the display control unit 44 generates an editing screen including the 3D stroboscopic image from the free viewpoint image generation unit 43 and the animation curve linked with (the object reflected in) the 3D stroboscopic image. Then, the display control unit 44 supplies the editing screen to the display unit 45 for display, and the processing proceeds from step S16 to step S17.

In step S17, the editing device 23 edits the free viewpoint image in accordance with the user's operation on the editing screen.

Figure 5:
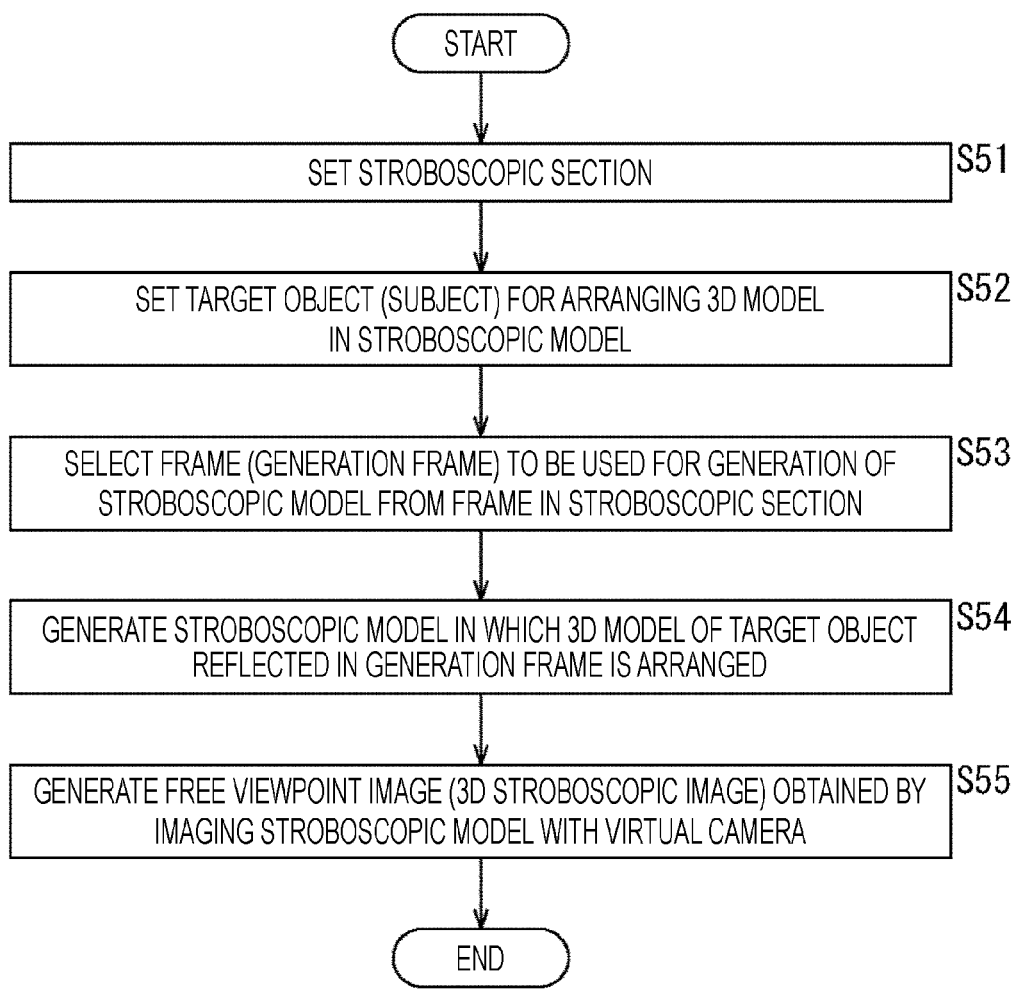
FIG. 5 is a flowchart illustrating details of processing in step S15 of generating a 3D stroboscopic image.

FIG. 5 is a flowchart illustrating details of the processing in step S15 in FIG. 4 for generating the 3D stroboscopic image.

In step S51, the stroboscopic model generation unit 49 sets a stroboscopic section that is a section of frames for which the stroboscopic model is to be generated, and the processing proceeds to step S52.

For example, the stroboscopic model generation unit 49 sets, as the stroboscopic section, a section from a past frame by a predetermined first number of frames to a future frame by a predetermined second number of frames, with reference to a frame of the free viewpoint image constituting the editing screen when the user performs operation to request display of the 3D stroboscopic image. The first and second number of frames can be set, for example, in accordance with the user's operation or the like.

In step S52, the stroboscopic model generation unit 49 sets the target object whose 3D model is to be arranged in the stroboscopic model from the object reflected in the free viewpoint image constituting the editing screen, and the processing proceeds to step S53.

For example, an object or the like specified in accordance with the user's operation or line of sight is set as the target object.

In step S53, the stroboscopic model generation unit 49 selects a generation frame to be used for generation of the stroboscopic model from the frames in the stroboscopic section, and the processing proceeds to step S54.

Here, when all frames in the stroboscopic section are used as generation frames for generation of the stroboscopic model, 3D models of the same object, the number of which is the same as the number of frames in the stroboscopic section, are arranged in an overlapping manner in the stroboscopic model, and the 3D stroboscopic image may be an image that is difficult to see.

Thus, the stroboscopic model generation unit 49 can select some frames from the frames in the stroboscopic section as generation frames, and generate the stroboscopic model by using (the 3D models of the objects reflected in) the generation frames.

For example, the stroboscopic model generation unit 49 can select, as the generation frame, a frame in which a degree of interference of the 3D models is less than or equal to a threshold value from the frames in the stroboscopic section. That is, the stroboscopic model generation unit 49 calculates the degree of interference representing a degree of overlap between the 3D models in a state where the 3D models of the target object reflected in the frames in the stroboscopic section are arranged in the three-dimensional space. For example, the degree of interference is calculated as 100% when the 3D models of any two frames completely overlap in the three-dimensional space, and as 0% when the 3D models do not overlap at all. Then, the stroboscopic model generation unit 49 selects a frame of which the degree of interference is less than or equal to a predetermined threshold value as the generation frame. As described above, by selecting the frame in which the degree of interference of the 3D models is less than or equal to the threshold value from the frames in the stroboscopic section as the generation frame and generating the stroboscopic model in which the 3D models of the target object reflected in the generation frame are arranged, it is possible to prevent the 3D stroboscopic image from being an image that is difficult to see because the 3D models are arranged in an overlapping manner in the stroboscopic model.

Note that, in addition, in the selection of the generation frame, for example, a frame in the stroboscopic section for each predetermined number of frames can be simply selected as the generation frame.

Furthermore, in a case where a key frame is set in a frame in the stroboscopic section, the key frame can be included in the generation frame. The key frame is, for example, a frame serving as a key for editing, such as a frame serving as an IN point or an OUT point for editing, or a frame serving as a start point for applying an effect.

In step S54, the stroboscopic model generation unit 49 uses the free viewpoint data stored in the storage unit 42 to generate the stroboscopic model in which the 3D models of the target object reflected in the plurality of generation frames selected from the frames in the stroboscopic section are arranged in (the 3D model of) a background as the imaging space when the target object is imaged. Then, the stroboscopic model generation unit 49 supplies the stroboscopic model to the free viewpoint image generation unit 43, and the processing proceeds from step S54 to step S55.

In step S55, the free viewpoint image generation unit 43 generates a 3D stroboscopic image that is a free viewpoint image obtained by imaging the stroboscopic model from the stroboscopic model generation unit 49 with the virtual camera having the camera parameter from the virtual camera setting unit 47, and the processing ends.

<Generation of 3D Stroboscopic Image>

Figure 6:
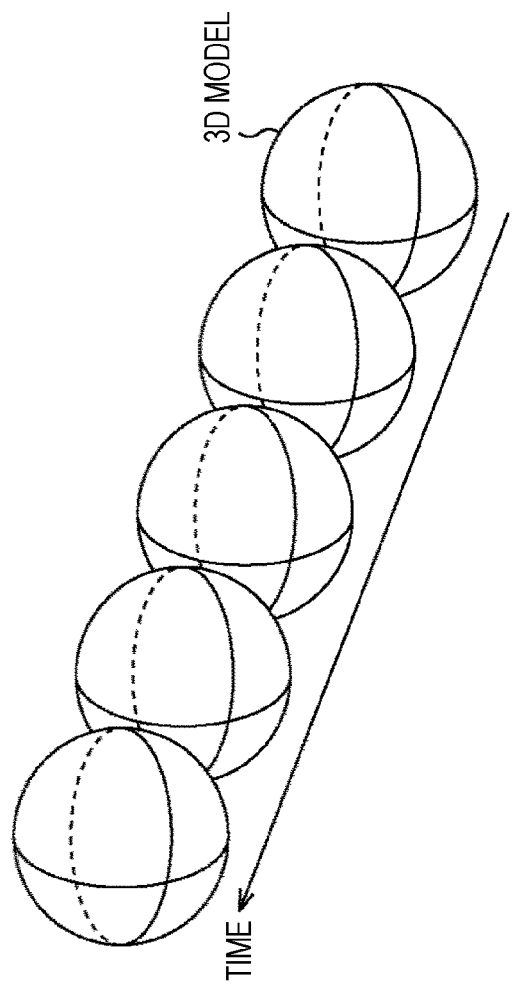
FIG. 6 is a diagram illustrating an example of an unnatural 3D stroboscopic image.

FIG. 6 is a diagram illustrating an example of an unnatural 3D stroboscopic image.

FIG. 6 illustrates an example of a 3D stroboscopic image generated from a stroboscopic model generated by using, as generation frames, five frames among frames of a viewpoint image obtained by imaging a ball rolling from the front side to the back side as an object.

In FIG. 6, the 3D models of the ball reflected in the five frames of the generation frames are arranged (rendered) to give priority to temporally later 3D models. For that reason, although the temporally later 3D model (of the ball) is located on the back side, arrangement is made so that the temporally earlier 3D model on the front side is hidden. As a result, the 3D stroboscopic image in FIG. 6 is an unnatural image.

Figure 7:
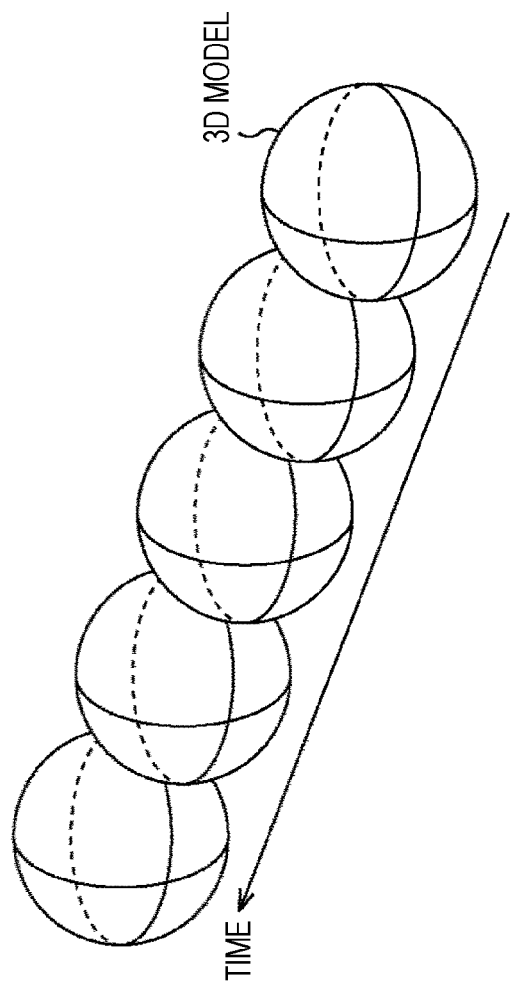
FIG. 7 is a diagram illustrating an example of a natural 3D stroboscopic image.

FIG. 7 is a diagram illustrating an example of a natural 3D stroboscopic image.

FIG. 7 illustrates an example of a 3D stroboscopic image generated from a stroboscopic model generated by using, as generation frames, five frames among frames of a viewpoint image obtained by imaging a ball rolling from the front side to the back side as an object.

In FIG. 7, the 3D models of the ball reflected in the five frames of the generation frames are arranged to give priority to the 3D models on the front side. For that reason, arrangement is made so that the 3D models on the front side hide the 3D models on the back side, that is, the 3D models on the front side are preferentially reflected. As a result, the free viewpoint image is a natural image.

The free viewpoint image generation unit 43 uses the depth (depth) of the 3D model of each object arranged in the stroboscopic model to generate (perform imaging, with the virtual camera, of) the 3D stroboscopic image in which the 3D model of the object on the front side is preferentially reflected as described above.

Figure 8:
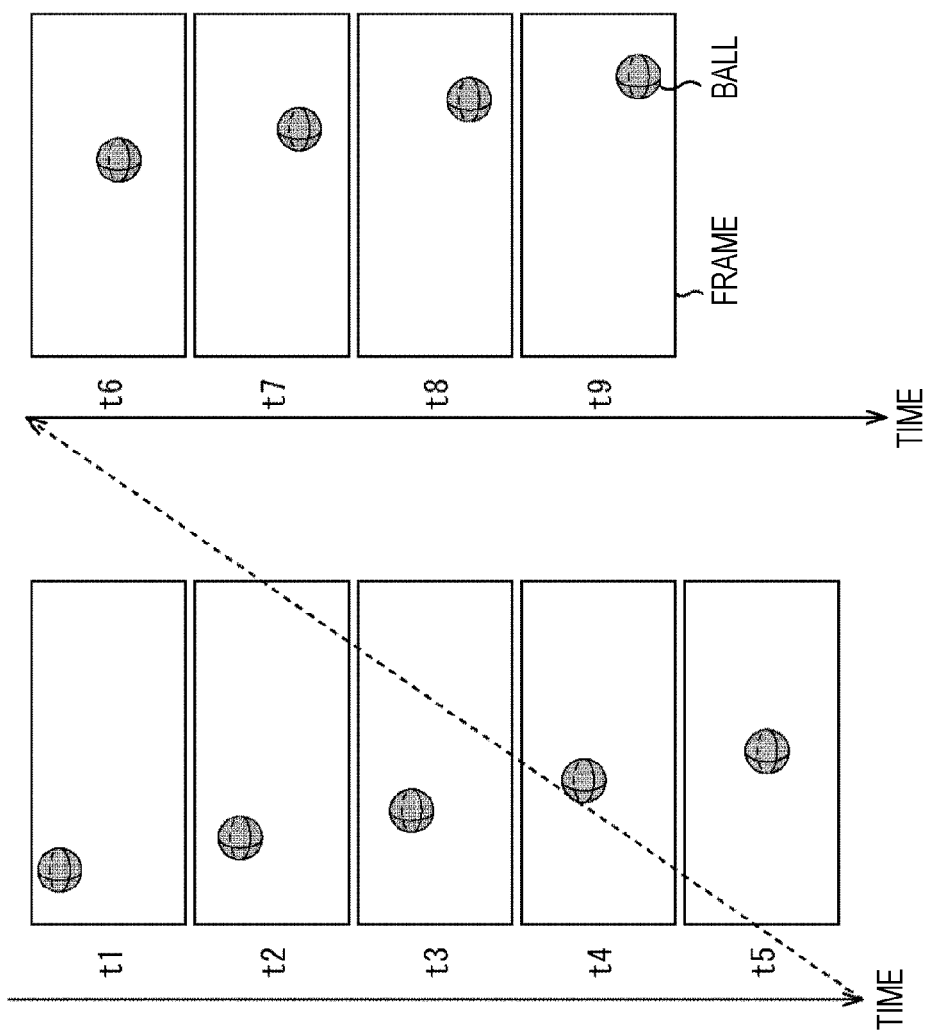
FIG. 8 is a diagram illustrating an example of frames of a viewpoint image in a stroboscopic section.

FIG. 8 is a diagram illustrating an example of frames of a viewpoint image in a stroboscopic section.

In FIG. 8, nine frames from times t1 to t9 are the frames of the viewpoint image in the stroboscopic section. In the frames from the times t1 to t9, a state in which a ball as an object rolls from left to right is reflected. FIG. 8 illustrates the frames of the viewpoint image of one viewpoint to avoid complication of the figure.

Figure 9:
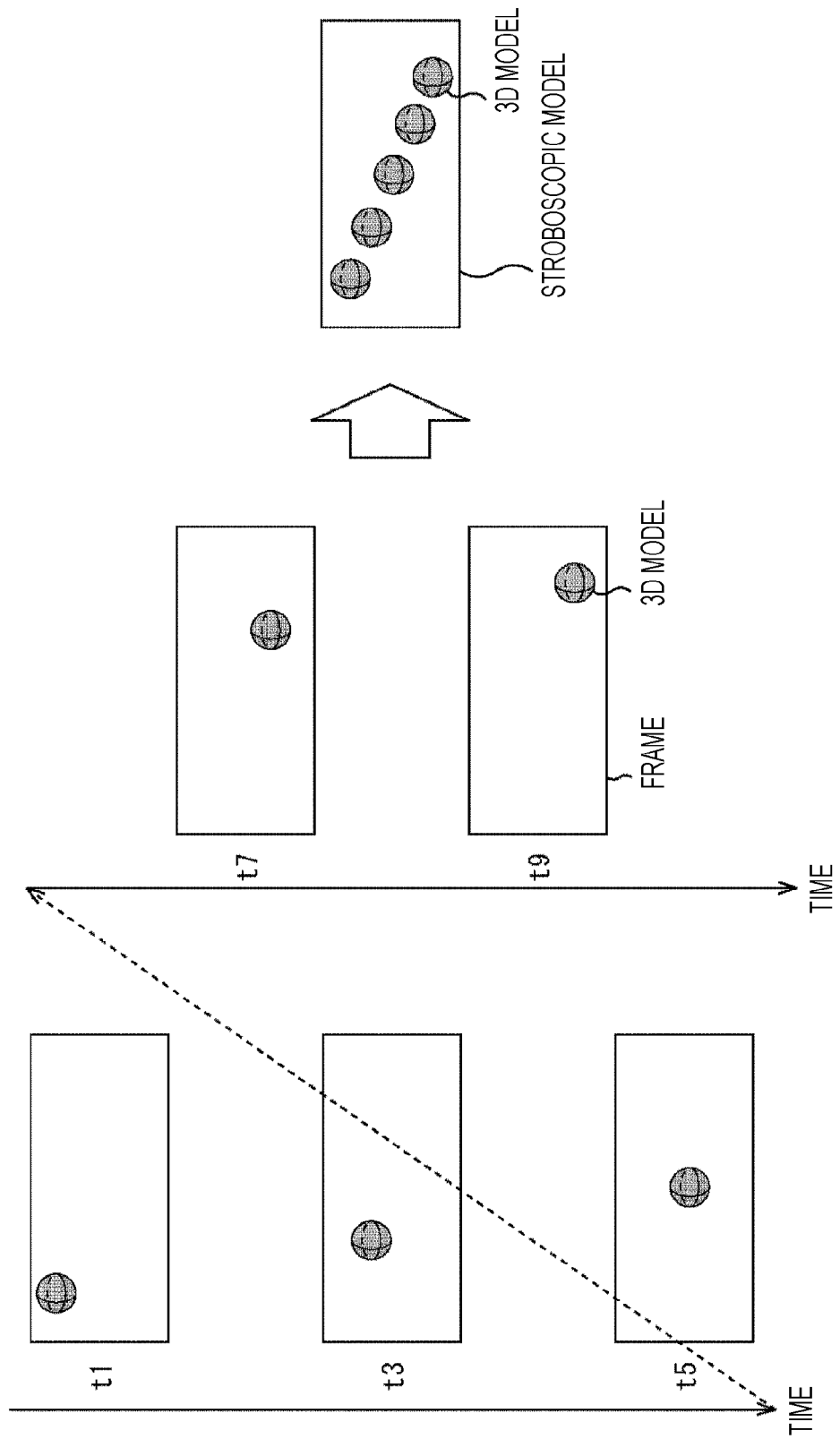
FIG. 9 is a diagram illustrating an example of generation of a stroboscopic model using frames at times t1 to t9 as the stroboscopic section.

FIG. 9 is a diagram illustrating an example of generation of a stroboscopic model using frames at the times t1 to t9 as the stroboscopic section.

In FIG. 9, the frames at the times t1, t3, t5, t7, and t9 among the frames at the times t1 to t9 as the stroboscopic section are selected as the generation frames. Moreover, in FIG. 9, a stroboscopic model is generated in which the 3D models of the ball as the object reflected in the frames at the times t1, t3, t5, t7, and t9 as the generation frames of the viewpoint images of the plurality of viewpoints are arranged.

Figure 10:
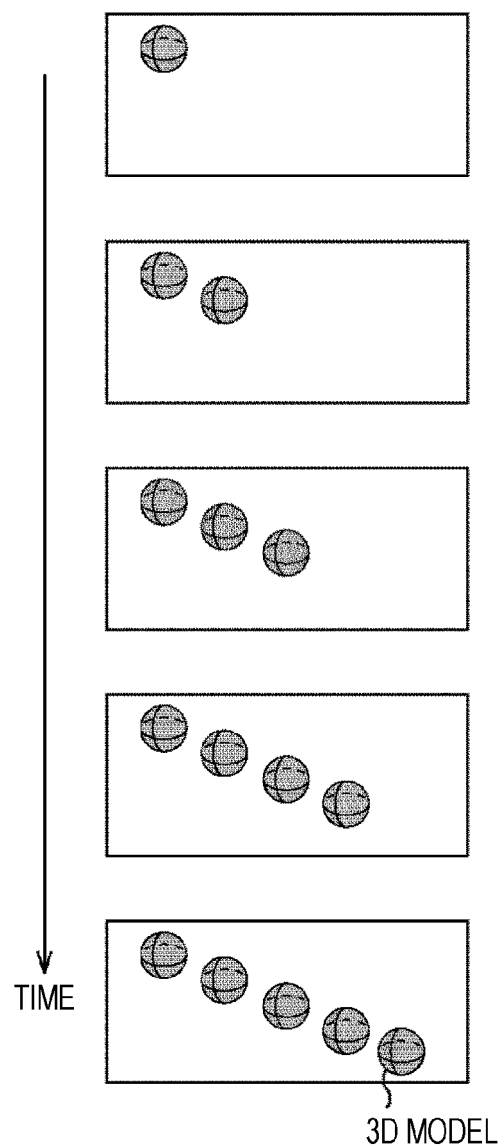
FIG. 10 is a diagram illustrating an example of display of a 3D stroboscopic image generated by imaging of the stroboscopic model by a virtual camera.

FIG. 10 is a diagram illustrating an example of display of the 3D stroboscopic image generated by imaging the stroboscopic model by the virtual camera.

As the 3D stroboscopic image, it is possible to generate and display a frame in which the 3D models of the ball as the object reflected in the frames at the times t1, t3, t5, t7, and t9 are imaged. Furthermore, as the 3D stroboscopic image, from the stroboscopic model in FIG. 9, it is possible to generate and sequentially display a frame in which the 3D model of the ball as the object reflected in the frame at the time t1 is imaged, a frame in which the 3D models of the ball as the object reflected in the frames at the times t1 and t3 are imaged, a frame in which the 3D models of the ball as the object reflected in the frames at the times t1, t3, and t5 are imaged, a frame in which the 3D models of the ball as the object reflected in the frames at the times t1, t3, t5, and t7 are imaged, and a frame in which the 3D models of the ball as the object reflected in the frames at the times t1, t3, t5, t7, and t9.

In the 3D stroboscopic image in FIG. 10, the imaging position and the like of the virtual camera that images the stroboscopic model are not changed, but the imaging position and the like of the virtual camera can be changed. For example, the stroboscopic model in which the 3D models of the ball as the object reflected in the frames at the times t1, t3, t5, t7, and t9 are arranged can be imaged by the virtual camera while the imaging position is changed. In a case where the imaging position is changed, a 3D stroboscopic image is displayed in which the viewpoint from which the stroboscopic model is viewed is changed and the camera angle changes.

<Example of Editing Screen>

Figure 11:
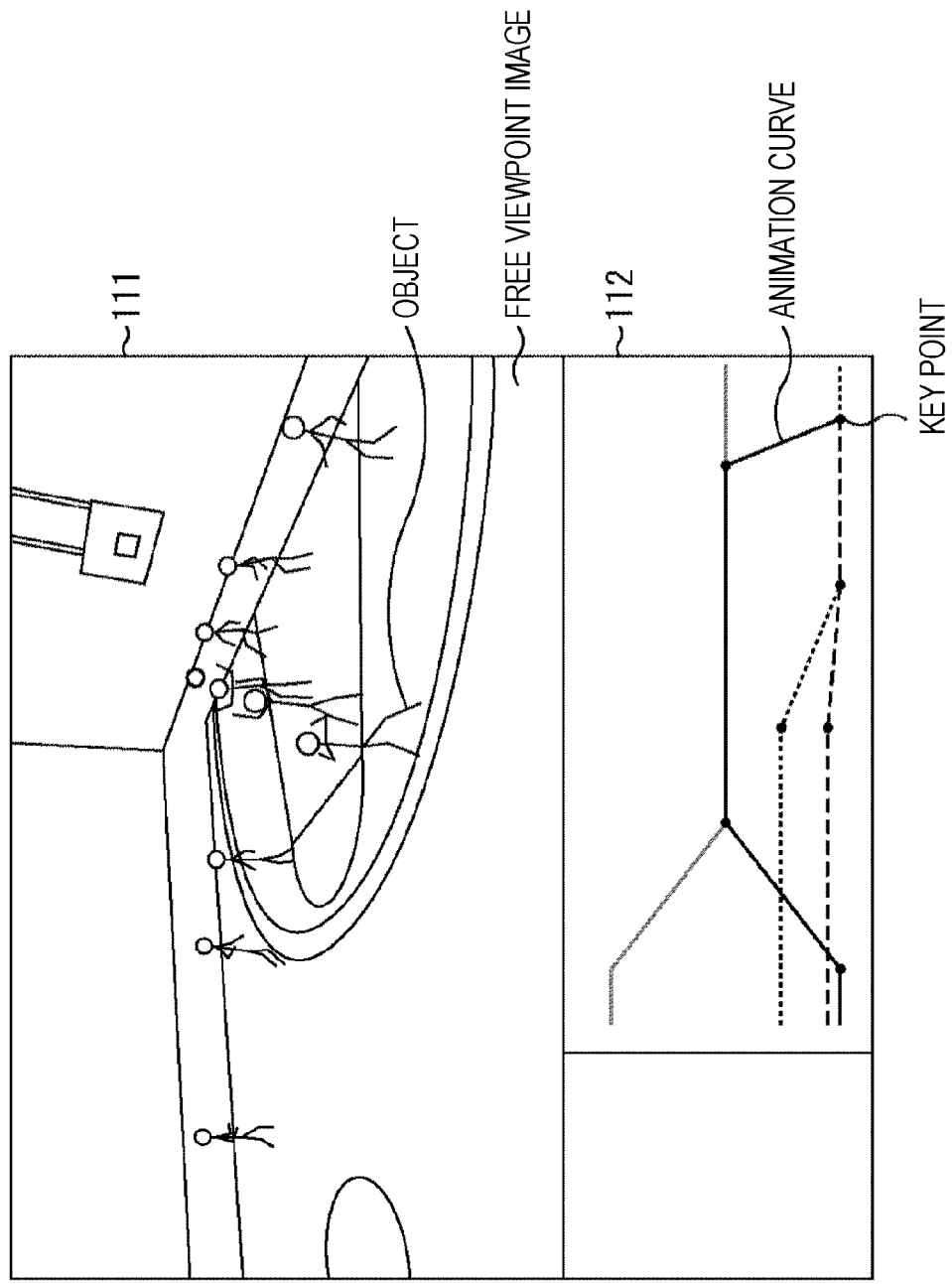
FIG. 11 is a diagram illustrating an example of an editing screen.

FIG. 11 is a diagram illustrating an example of the editing screen.

Here, in an existing non-linear editing tool, when an animation curve for which an amount of effect is edited is determined, a key frame is set while playback of a 2D image-based captured image is performed.

For example, in an existing non-linear editing tool, the user sets an appropriate timing of the key frame while repeating continuous display of thumbnails, reproduction, rewinding, fast-forwarding, and the like on a player screen.

In an existing non-linear editing tool, when a plurality of key frames is set and the number of editing parameters to be operated increases, key points representing the plurality of key frames are displayed on a plurality of animation curves, and it may be difficult to intuitively determine at which timing and which editing parameter should be changed.

Furthermore, in a case where an editing target is a free viewpoint image, when (3D) synthesis of a plurality of free viewpoint images is performed, it is important to arrange a plurality of objects (subjects) at appropriate positions and timings in time and space. However, it is difficult to prevent unnatural overlap between objects and to match the timings of movement of objects only by simply synthesizing 3D models at a certain moment and rendering the combined 3D models into a 2D image.

For example, to perform time stretching while confirming that objects of a plurality of dancers separately imaged at different times do not overlap in any time and space and matching the timings, speeds, and positions of a decisive moment such as jumping of the dancers, it is expected that it is necessary to adjust a reproduction speed, a position of the object, a timing of movement of the object, and the like while moving on a timeline many times.

Unlike modeling by computer graphics (CG) software that can change operation, a position, a shape, and the like of a plurality of 3D models by a creator's intention or automatic control, in editing of a live-action-based free viewpoint image imaged by the imaging device 21, a complicated constraint condition (restraint condition) occurs such as no unnatural overlap between objects.

Thus, a breakthrough of an editing user interface (UI) for facilitating editing of the free viewpoint image is required.

According to the editing screen of the present technology, the free viewpoint image can be easily edited.

As illustrated in FIG. 11, the editing screen includes an image display section 111 and a parameter display section 112.

A free viewpoint image is displayed on the image display section 111.

In the parameter display section 112, the editing parameter to be edited in editing of the free viewpoint image linked with the free viewpoint image such as the 3D stroboscopic image displayed on the image display section 111 is displayed with the horizontal axis as time and the vertical axis as a value of the editing parameter. A curve representing a temporal change of the editing parameter is called an animation curve. Thus, the animation curve is displayed on the parameter display section 112. A black circle on the animation curve represents a key point. The key point represents (the time of) the key frame. The key frame is, for example, a frame serving as a key for editing, such as a frame serving as an IN point or an OUT point for editing, or a frame serving as a start point for applying an effect. The key frame is set, for example, in accordance with the user's operation or the like.

In FIG. 11, a free viewpoint image obtained by imaging a game of basketball is displayed.

Objects (players, balls, basketball hoops, and the like) reflected in the free viewpoint image have various parameters.

Examples of the parameters of the objects include an object identification ID, an object type (label), 3D data with time information, a bounding box with time information, a barycentric position with time information, and other metadata.

The object identification ID is a unique ID given to an object. The object type (label) represents a type (kind) of an object, such as a ball or a player. The 3D data with time information is 3D data such as meshes constituting a 3D model of an object at each time and points of a point cloud. The bounding box with time information is data of a bounding box that is a rectangular parallelepiped surrounding a 3D model of an object at each time. The barycentric position with time information is a barycentric position of a 3D model of an object at each time. Examples of the other metadata include data representing a name of an object, an action being performed, a speed at which the object moves, states of other objects, and the like.

For example, with (each of x, y, z coordinates as) the barycentric position with time information, and color, brightness of the object grasped from the 3D shape data with time information, and the like as editing parameters, the parameter display section 112 can display an animation curve that is a temporal change of the editing parameters. Furthermore, the parameter display section 112 can display, for example, an animation curve of the camera parameters when the free viewpoint image displayed on the image display section 111 is imaged by the virtual camera.

For example, the user pauses reproduction of the free viewpoint image displayed on the image display section 111 of the editing screen, and can select any object reflected in the free viewpoint image in a paused state as (an object that is) an editing target by clicking or the like.

Figure 12:
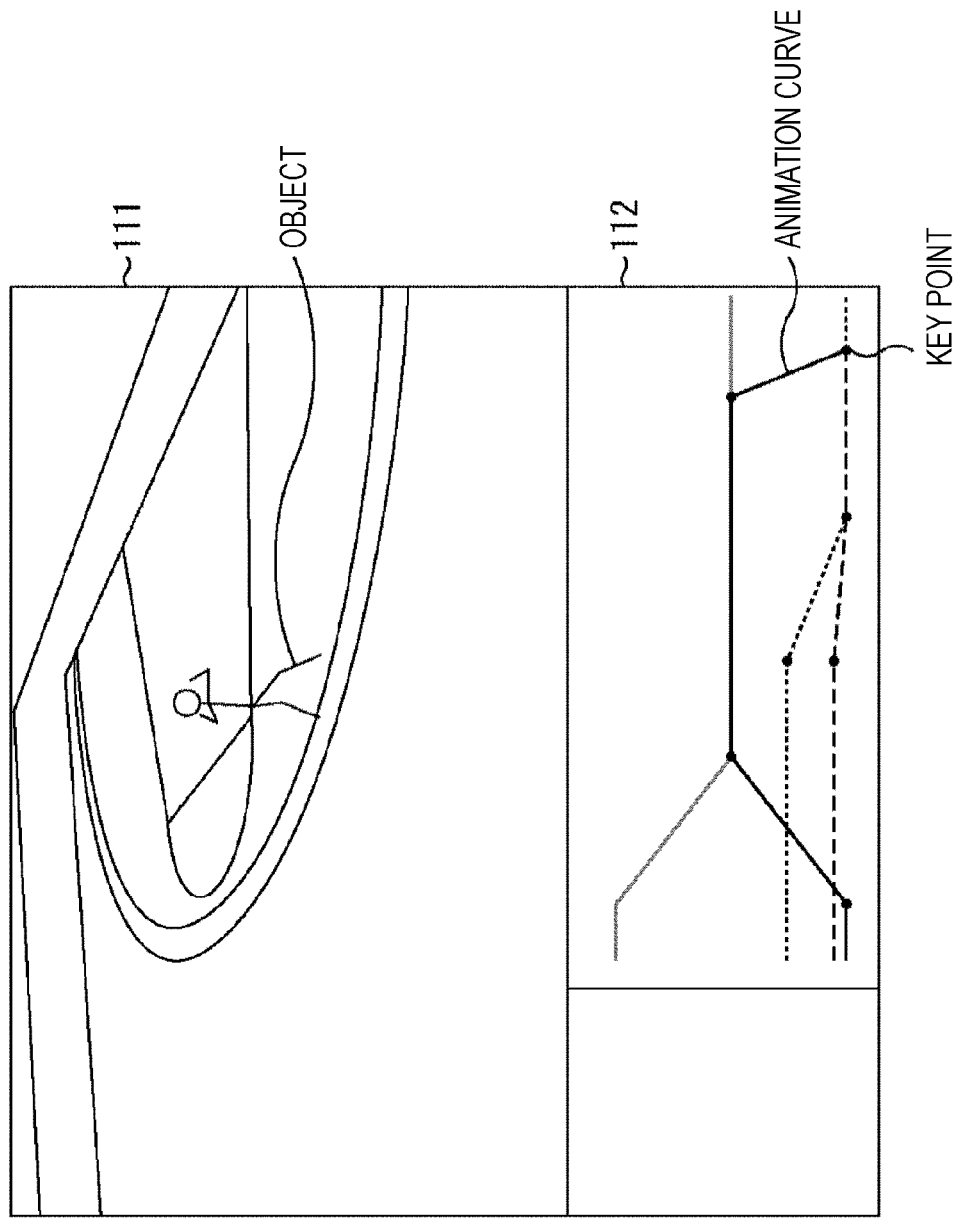
FIG. 12 is a diagram illustrating an example of the editing screen after an object that is an editing target is selected.

FIG. 12 is a diagram illustrating an example of the editing screen after the object that is the editing target is selected.

Any object other than the object selected as the editing target may interfere with the user's editing work, and thus can be deleted from the free viewpoint image.

In FIG. 12, one of the players is selected as the editing target, and the other players are deleted.

When the user performs operation of confirming the selection of the object as the editing target, the stroboscopic model generation unit 49 sets the object as the editing target as a target object whose stroboscopic model 3D model is arranged in the stroboscopic model. Then, the stroboscopic model generation unit 49 sets a predetermined section including the frame of the free viewpoint image displayed on the image display section 111 as the stroboscopic section, generates the stroboscopic model in which the 3D models of the target object are arranged, and supplies the stroboscopic model to the free viewpoint image generation unit 43.

The free viewpoint image generation unit 43 generates a free viewpoint image as a 3D stroboscopic image from the stroboscopic model from the stroboscopic model generation unit 49, and supplies the free viewpoint image to the display control unit 44.

Furthermore, the editing parameter acquisition unit 48 acquires, from the free viewpoint data or the like stored in the storage unit 42, for example, information related to the target object reflected in the 3D stroboscopic image and to be edited in editing of the free viewpoint image, as an editing parameter linked with the 3D stroboscopic image, and supplies the information to the display control unit 44.

The display control unit 44 generates an editing screen including (display of) the free viewpoint image as the 3D stroboscopic image supplied from the free viewpoint image generation unit 43 and the animation curve that is the temporal change of the editing parameter supplied from the editing parameter acquisition unit 48, and supplies the editing screen to the display unit 45 for display.

Figure 13:
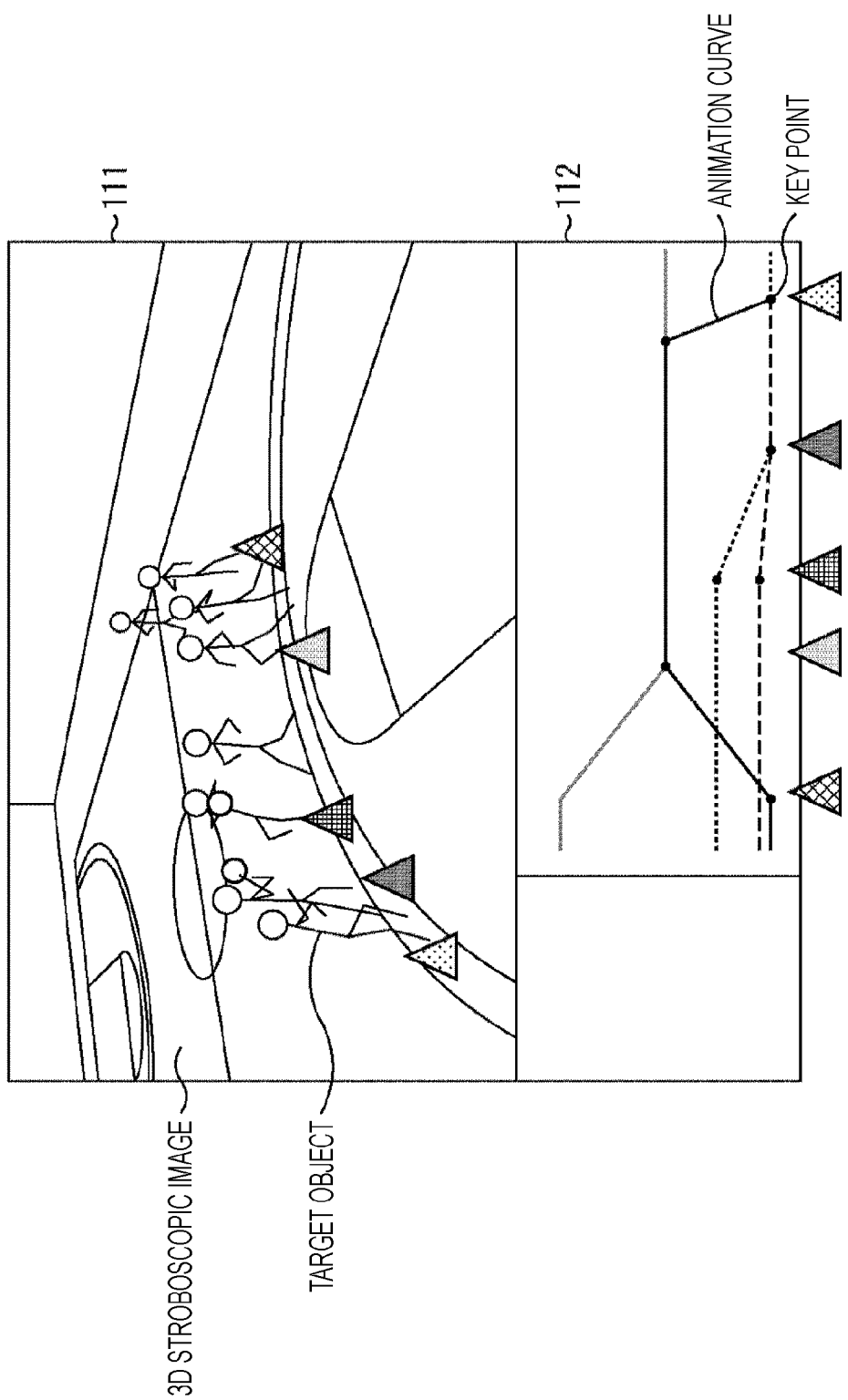
FIG. 13 is a diagram illustrating an example of the editing screen including a 3D stroboscopic image and an animation curve linked with the 3D stroboscopic image.

FIG. 13 is a diagram illustrating an example of the editing screen including a 3D stroboscopic image and an animation curve linked with the 3D stroboscopic image.

In FIG. 13, a (target) object to which a triangle having the same pattern as a triangle attached to a key point is attached is an object reflected in a key frame represented by the key point.

In generation of the 3D stroboscopic image reflecting the target object, the stroboscopic section and the generation frame can be fixedly or adaptively selected.

As a method of adaptively selecting the stroboscopic section and the generation frame, there is a method of selecting the stroboscopic section and the generation frame depending on an amount of movement and a speed of the target object, for example. Furthermore, as a method of selecting the stroboscopic section and the generation frame, a plurality of selection methods considered to be appropriate for the content can be prepared, and a selection method corresponding to the user's instruction can be adopted from among the plurality of selection methods.

In addition, regarding the selection of the generation frame, for example, the generation frame can be selected such that a distance between a 3D model of the target object reflected in a certain generation frame and 3D models of the target object reflected in generation frames before and after the certain generation frame is a constant distance. Furthermore, in a section in which the speed of the target object is fast, the generation frames can be selected at close intervals. Moreover, for example, a frame reflecting a scene in which the target object jumps and reaches the highest point, a frame reflecting a scene in which the target object shoots, or a frame reflecting another specific scene can be detected by an intelligent detection method and selected as the generation frame.

Note that, the key frame represented by the key point on the animation curve can be forcibly selected as the generation frame. In this case, a 3D stroboscopic image reflecting the target object reflected in the key frame can be generated.

On the editing screen, a 3D stroboscopic image reflecting the target objects in a plurality of generation frames is displayed on the image display section 111, and an animation curve linked with the target object and the like reflected in the 3D stroboscopic image, that is, for example, an animation curve of the barycentric position with time information of the target object, or the like is displayed on the parameter display section 112, whereby a preparation is ready for the user to edit the animation curve (editing parameter) in the timeline while viewing and grasping a change in the target object.

Figure 14:
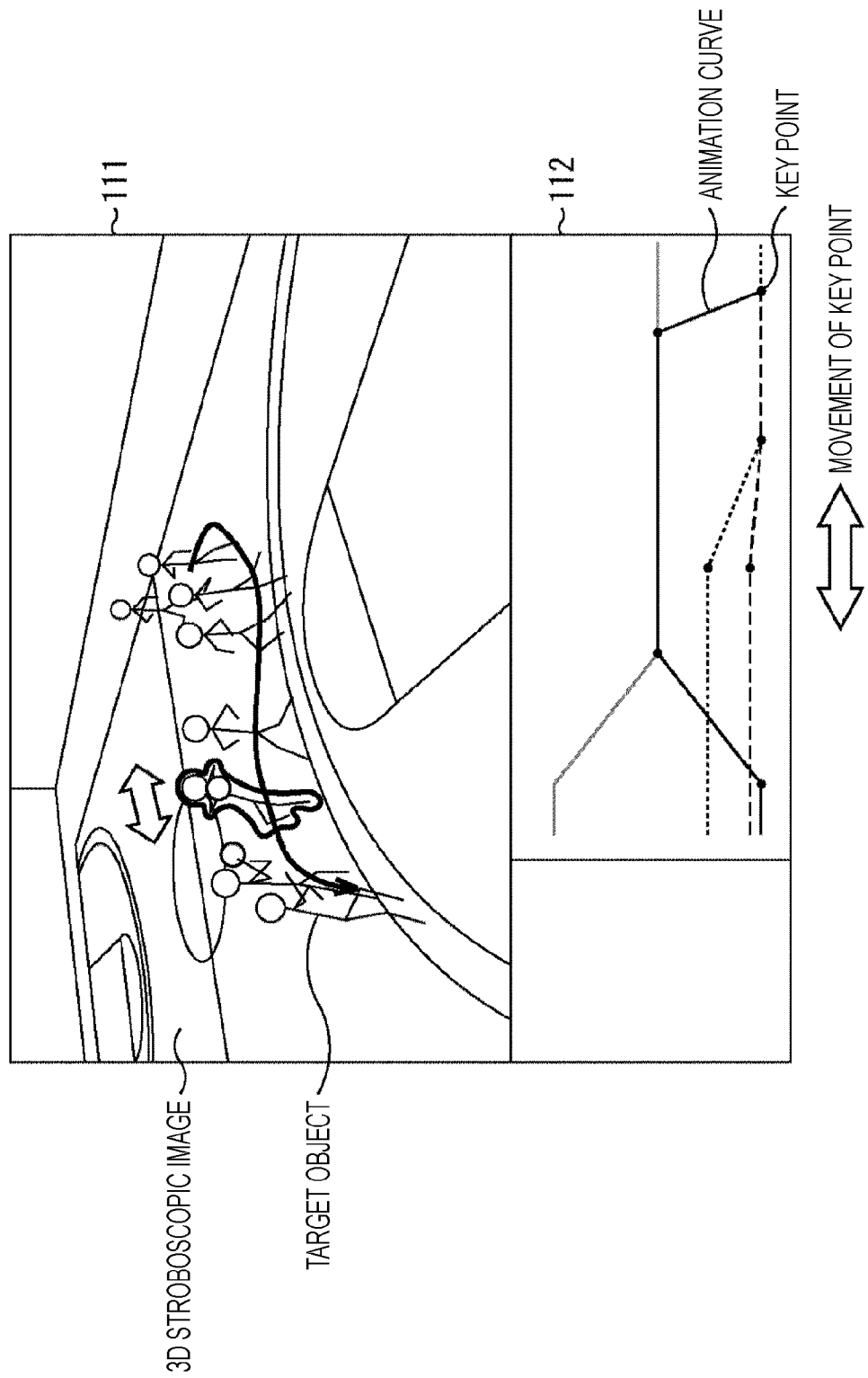
FIG. 14 is a diagram illustrating an example of linkage between the 3D stroboscopic image displayed on an image display section 111 and the animation curve displayed on a parameter display section 112.

FIG. 14 is a diagram illustrating an example of linkage between the 3D stroboscopic image displayed on the image display section 111 and the animation curve displayed on the parameter display section 112.

By clicking a target object reflected in the 3D stroboscopic image displayed on the image display section 111, the user can select the clicked target object as an object of interest to which attention is paid. Furthermore, by clicking a key point on (the timeline of) the animation curve displayed on the parameter display section 112, the user can select a target object reflected in a key frame represented by the clicked key point as the object of interest. In FIG. 14, a target object surrounded by a thick line is selected as the object of interest.

Then, the user can move the object of interest reflected in the 3D stroboscopic image displayed on the image display section 111 by dragging (scrubbing) the object of interest.

For example, in a case where the object of interest is a target object reflected in a key frame, the display control unit 44 moves a key point on the animation curve representing the key frame reflecting the object of interest along the animation curve in conjunction with the movement of the object of interest.

As described above, the key point is moved, whereby the key frame is changed to a frame represented by a moved key point.

Thus, the user can intuitively perform editing operation of changing the key frame by operation on the 3D stroboscopic image with good visibility in time and space rather than on the timeline of the animation curve with a poor amount of information.

Note that, the display control unit 44 can display a GUI such as an arrow representing movement of the barycentric position of the object of interest when the object of interest is moved on the 3D stroboscopic image displayed on the image display section 111. As a result, the user can easily recognize a position after the movement when the object of interest is moved.

Here, in FIG. 14, a unidirectional arrow illustrated in the 3D stroboscopic image represents a locus of movement of the target object. The movement of the object of interest is performed along the unidirectional arrow. The unidirectional arrow may or may not be actually displayed.

Figure 15:
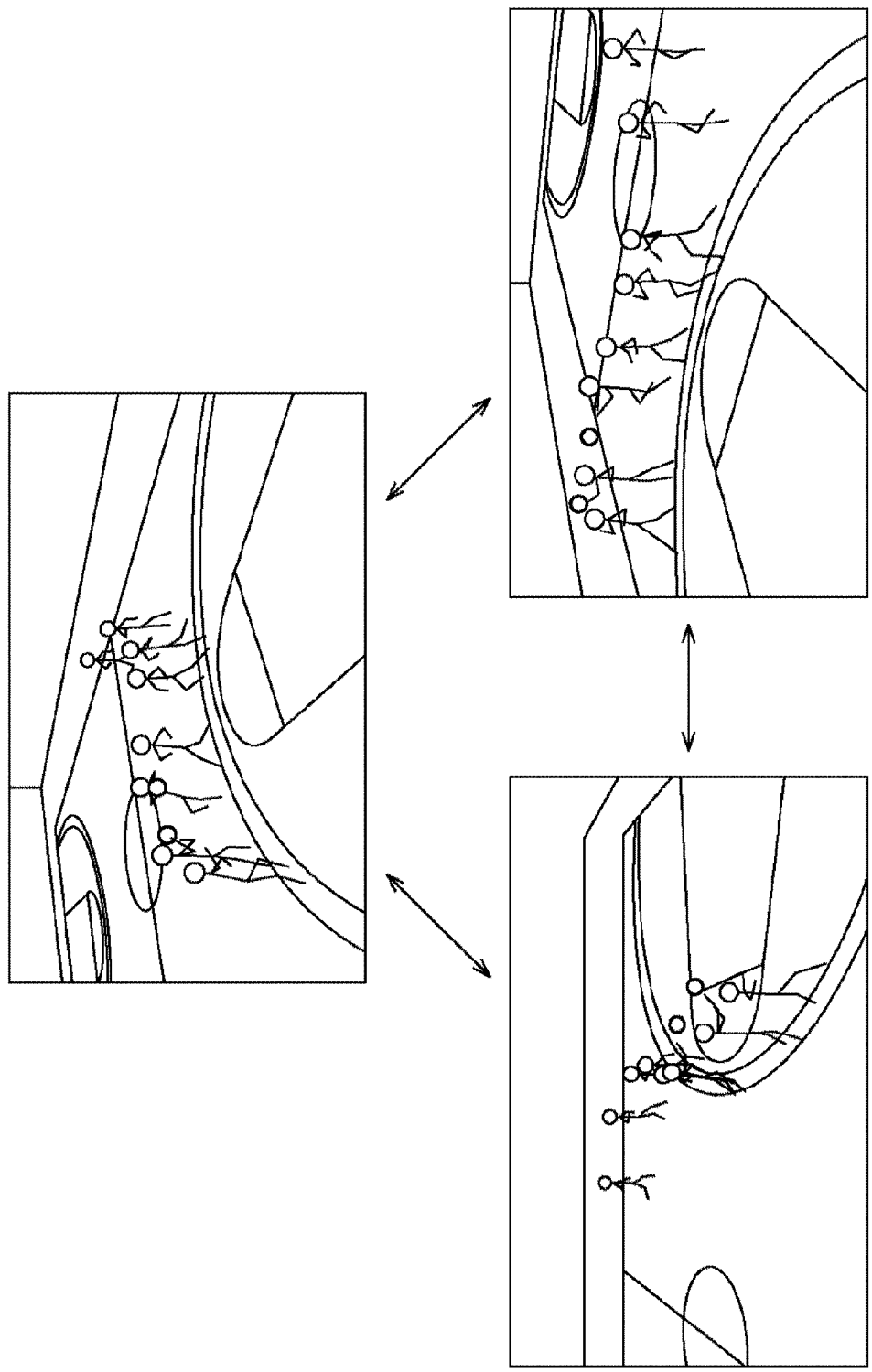
FIG. 15 is a diagram illustrating an example of a 3D stroboscopic image obtained by changing a camera parameter of the virtual camera.

FIG. 15 is a diagram illustrating an example of a 3D stroboscopic image obtained by changing a camera parameter of the virtual camera.

Since the 3D stroboscopic image displayed on the image display section 111 of the editing screen is an image obtained by imaging the stroboscopic model with the virtual camera, the angle and the like can be changed by changing the camera parameters such as the imaging position of the virtual camera.

For example, in a case where the stroboscopic model is imaged from a certain imaging position, the 3D models of the target object arranged in the stroboscopic model may be arranged in the depth direction when viewed from the virtual camera, and the target objects may densely overlap in the 3D stroboscopic image. In this case, it is difficult for the user to select (the target object to be set as) the object of interest.

Thus, the user can change the camera parameters such as the imaging position and the zoom magnification of the virtual camera by operation on the operation unit 46 or the like.

For example, when the imaging position of the virtual camera is changed, the 3D stroboscopic image displayed on the image display section 111 is changed to a 3D stroboscopic image in which the stroboscopic model is imaged from a changed imaging position as illustrated in FIG. 15.

As described above, by changing the camera parameters of the virtual camera, the user can display the 3D stroboscopic image reflecting the target object in a state where the object of interest is easily selected.

Note that, on the editing screen, the user's operation (hereinafter, also referred to as parameter change operation) of changing the camera parameters of the virtual camera that performs imaging for generating the 3D stroboscopic image to be displayed on the image display section 111 is operation for displaying, on the image display section 111, the 3D stroboscopic image reflecting the target object in a state suitable for the user who performs the editing work.

Such parameter change operation can be performed as necessary. Furthermore, the camera parameters after the change by the parameter change operation are not reflected in editing of the free viewpoint image. Thus, in a case where the parameter change operation is performed, the free viewpoint image imaged by the virtual camera having the camera parameter changed by the parameter change operation is not generated as the edited free viewpoint image.

However, the editing device 23 can also reflect the camera parameter changed by the parameter change operation in editing of the free viewpoint image.

Figure 16:
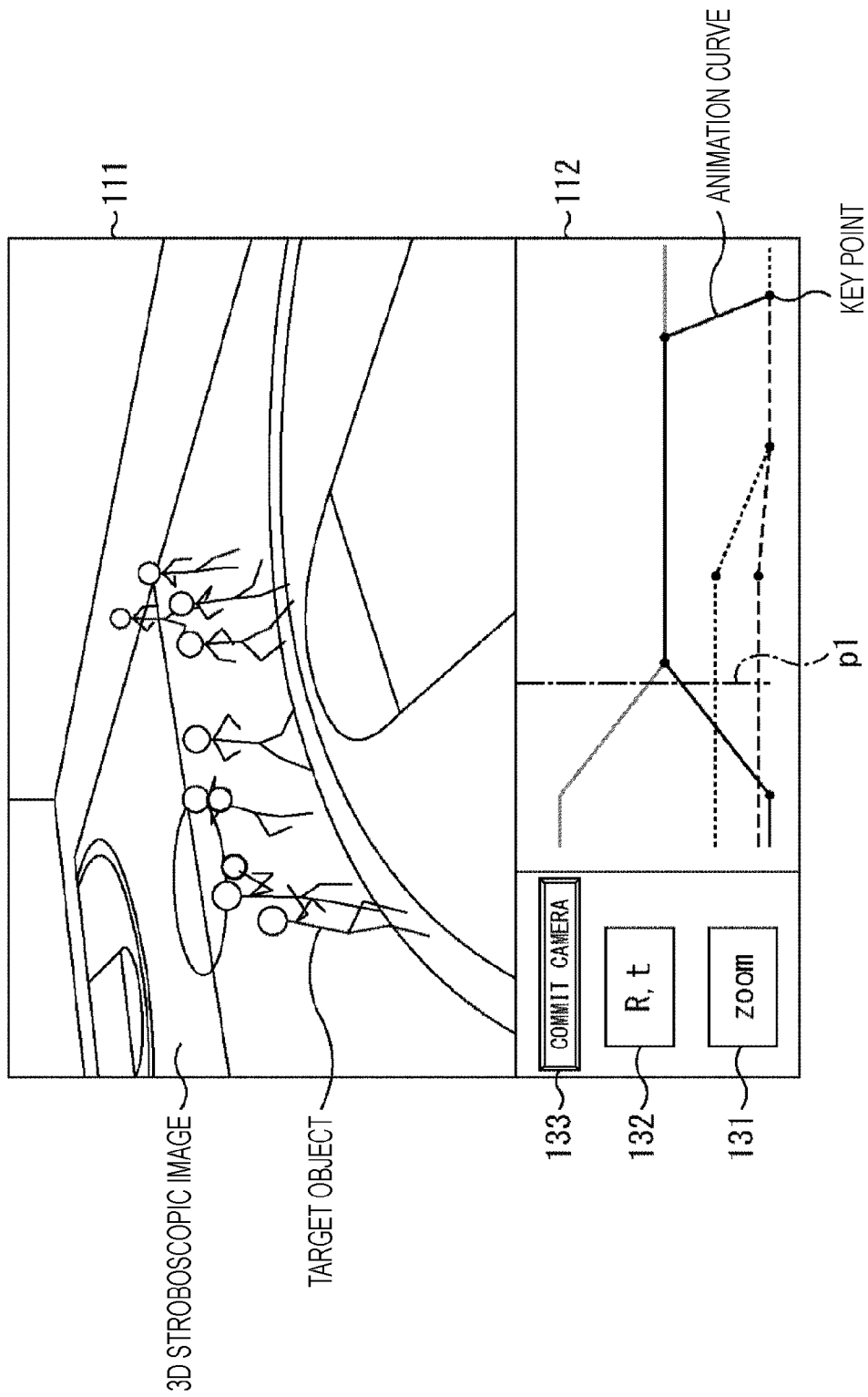
FIG. 16 is a diagram illustrating an example of the editing screen in a case where a user performs operation to request change of the camera parameter of the virtual camera.

FIG. 16 is a diagram illustrating an example of the editing screen in a case where the user performs operation to request change of the camera parameter of the virtual camera.

When the user performs operation to request the change of the camera parameter of the virtual camera, operation panels 131 and 132 and a commit button 133 are displayed on the editing screen.

The operation panel 131 is operated when the zoom magnification of the virtual camera is set. The operation panel 132 is operated in a case where the imaging position and the imaging posture (orientation) of the virtual camera are set.

In accordance with the operations of the operation panels 131 and 132, the virtual camera setting unit 47 changes the camera parameters of the virtual camera, that is, (settings of) the zoom magnification, the imaging position, or the imaging posture, for example, and supplies the changed camera parameters to the free viewpoint image generation unit 43. As a result, the free viewpoint image generation unit 43 generates a 3D stroboscopic image obtained by imaging the stroboscopic model with the virtual camera having the changed zoom magnification, imaging position, and imaging posture, and supplies the 3D stroboscopic image to the display control unit 44.

The display control unit 44 displays, on the image display section 111, the 3D stroboscopic image obtained by imaging the stroboscopic model with the virtual camera having the changed zoom magnification, imaging position, and imaging posture from the free viewpoint image generation unit 43.

The commit button 133 is operated in a case where the camera parameters of the virtual camera that has imaged the 3D stroboscopic image displayed on the image display section 111 are reflected in the edited free viewpoint image.

For example, when the user specifies a predetermined position p1 (time) (frame) on the animation curve as a key point and operates the operation panels 131 and 132 to change the camera parameters of the virtual camera, a 3D stroboscopic image obtained by imaging the stroboscopic model with the virtual camera having the changed camera parameters is displayed on the image display section 111. Then, when the user operates the commit button 133, the display control unit 44 changes the animation curve displayed on the parameter display section 112 in conjunction with the changed camera parameters, that is, the camera parameters of the virtual camera that has imaged the 3D stroboscopic image displayed on the image display section 111.

Specifically, in a case where an animation curve of the camera parameters such as the zoom magnification, the imaging position, and the imaging posture of the virtual camera is displayed on the parameter display section 112, the display control unit 44 changes the animation curve so that the changed camera parameters are reflected.

Figure 17:
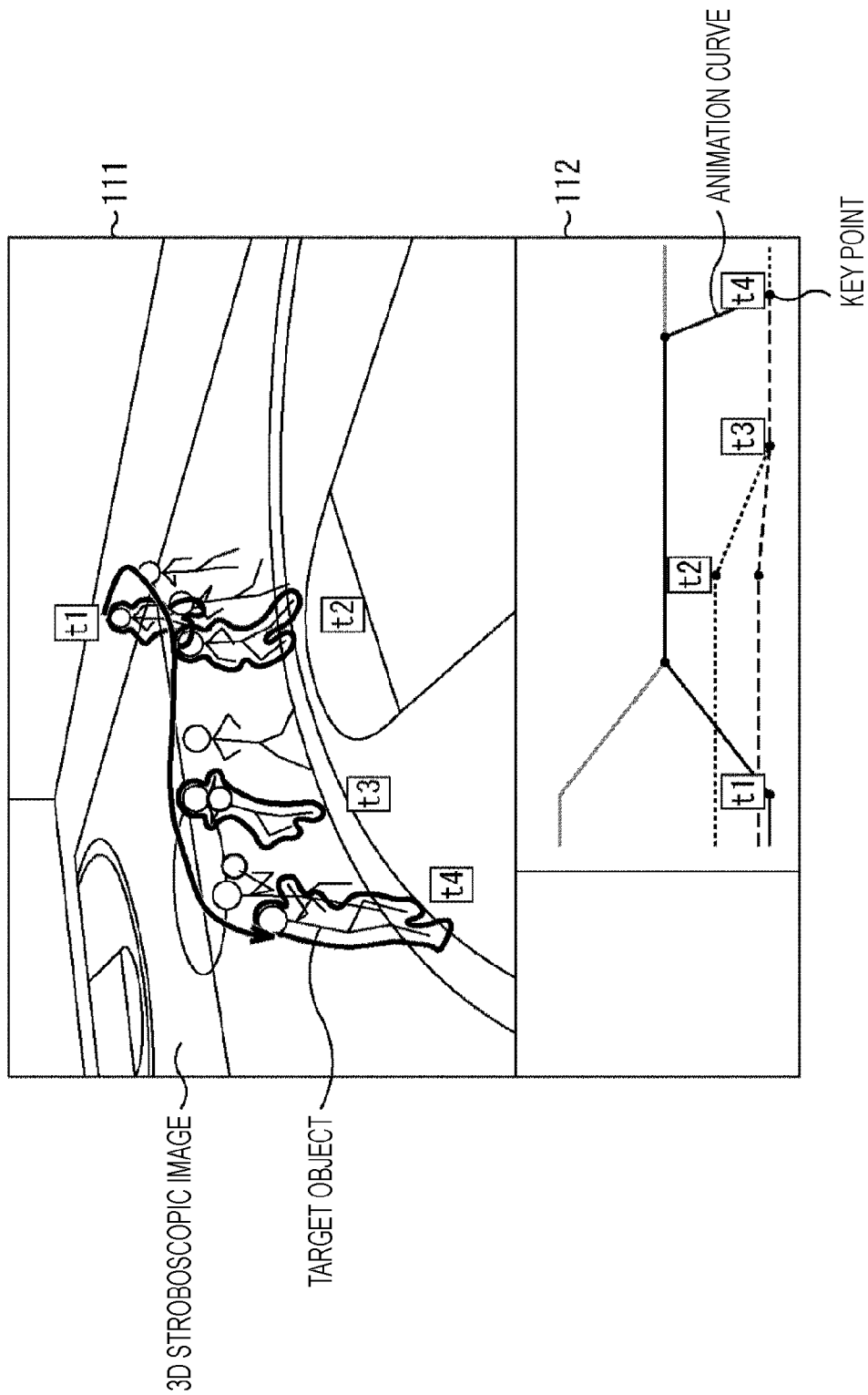
FIG. 17 is a diagram illustrating an example of an association display in which a key point is associated with a target object reflected in a key frame represented by the key point.

FIG. 17 is a diagram illustrating an example of an association display in which a key point is associated with a target object reflected in a key frame represented by the key point.

When the number of key frames (key points) increases, correspondence between a key point on the animation curve displayed on the parameter display section 112 and the target object reflected in a key frame represented by the key point on the 3D stroboscopic image displayed on the image display section 111 may be difficult to understand.

Thus, on the editing screen, it is possible to perform association display in which a key point is associated with the target object reflected in a key frame represented by the key point.

As the association display, for example, it is possible to adopt attaching the same tag t #i (in FIG. 17, tags t1, t2, t3, and t4) to a key point and the target object on the 3D stroboscopic image corresponding to the key point (the target object reflected in a key frame represented by the key point).

Furthermore, as the association display, for example, it is possible to adopt assigning a color to a key point and surrounding the target object on the 3D stroboscopic image corresponding to the key point by the same color as the color assigned to the key point.

As described above, by performing the association display, the user can visually and intuitively recognize the target object on the 3D stroboscopic image corresponding to the key point on the animation curve.

Figure 18:
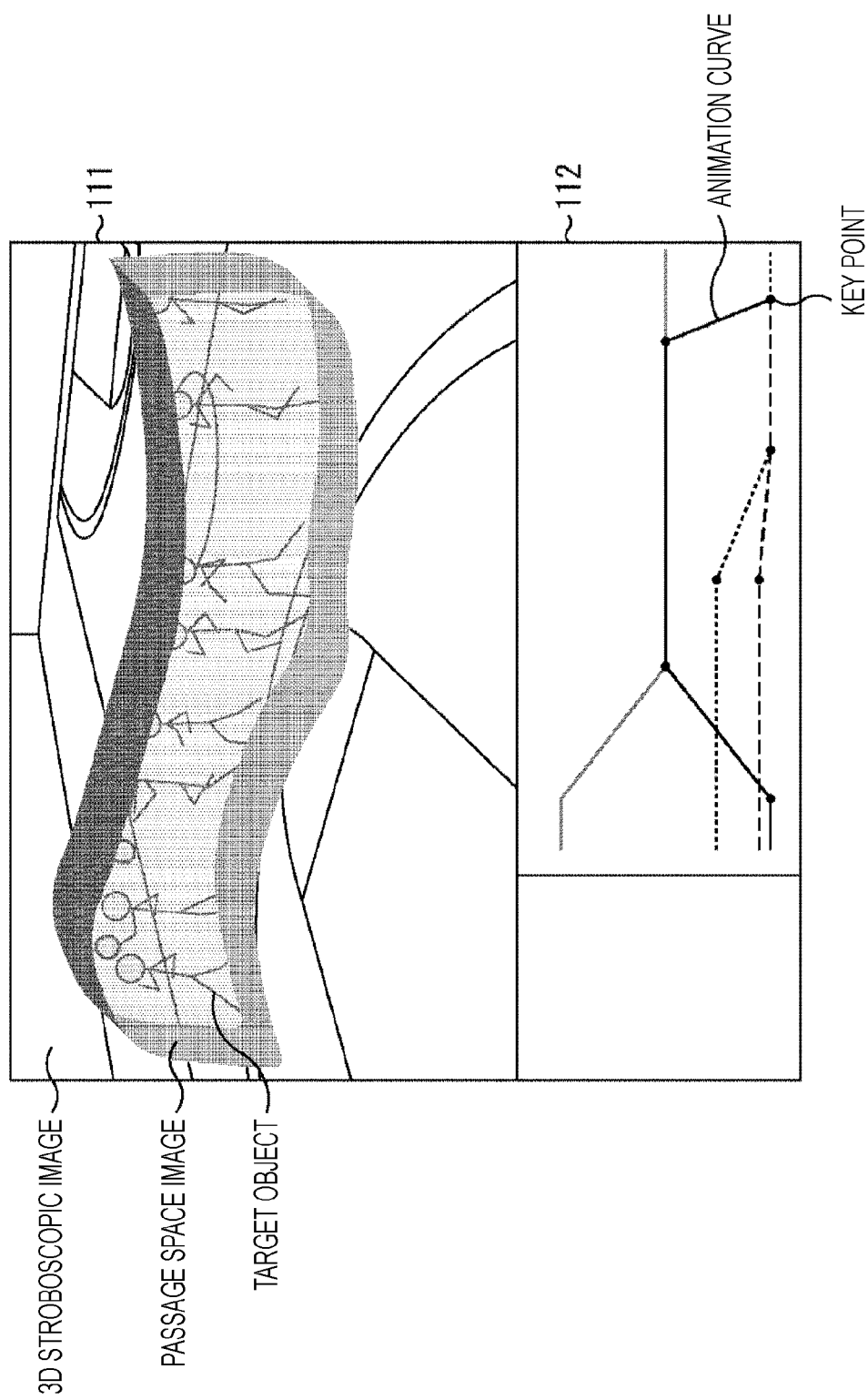
FIG. 18 is a diagram illustrating an example of a 3D stroboscopic image on which a passage space image representing a space through which the target object passes is superimposed.

FIG. 18 is a diagram illustrating an example of a 3D stroboscopic image on which a passage space image representing a space through which the target object passes is superimposed.

The display control unit 44 can display, on the image display section 111, the 3D stroboscopic image on which the passage space image representing the space through which the target object passes is superimposed.

As the passage space image, a translucent pipe-shaped image or the like can be adopted.

By displaying the passage space image for a plurality of different objects, it is possible to easily confirm whether or not (3D models of) the objects collide (interfere) with each other when the plurality of objects is synthesized.

Furthermore, since the target object reflected in the 3D stroboscopic image is a target object at discrete time (frame), it may be difficult to confirm whether a certain object objA and another object objB can collide with each other only by displaying the 3D stroboscopic image in which each of the object objA and the object objB is a target object.

On the other hand, by displaying the passage space image for each of the object objA and the object objB, it is possible to easily confirm whether the object objA and the object objB can collide with each other.

Figure 19:
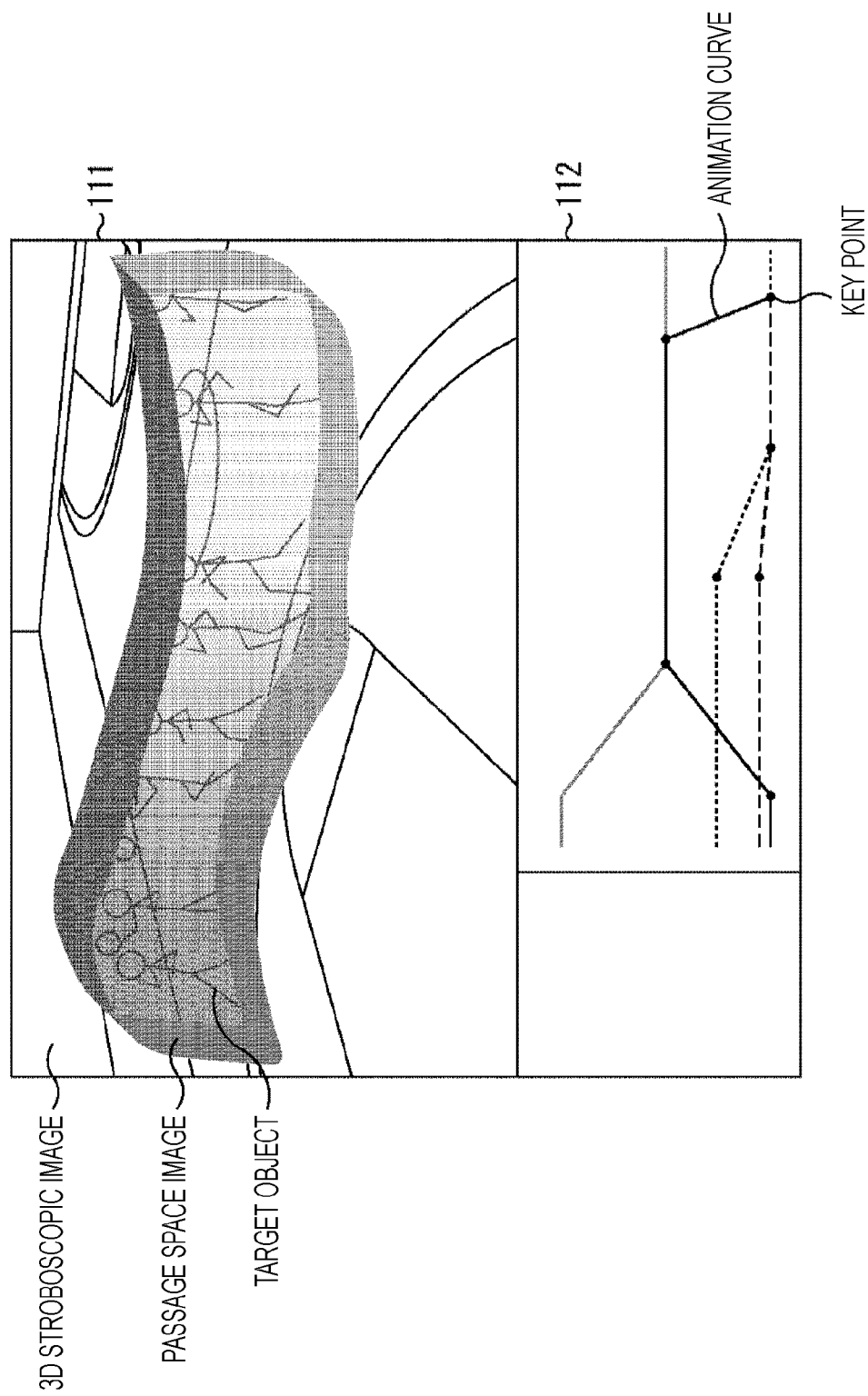
FIG. 19 is a diagram illustrating another example of the 3D stroboscopic image on which the passage space image representing the space through which the target object passes is superimposed.

FIG. 19 is a diagram illustrating another example of the 3D stroboscopic image on which the passage space image representing the space through which the target object passes is superimposed.

The passage space image in FIG. 19 is an image representing the space through which the target object passes with the passage of time.

That is, the passage space image in FIG. 19 is more transparent as the time at which the target object passes is earlier (past time), and is darker as the time at which the target object passes is later (future time).

In addition, in the passage space image, the passage of time can be expressed by gradation. For example, in the passage space image, a space portion through which the target object passes at the earliest time can be set to blue, and the passage space image can be gradually changed to red with the passage of time.

By adopting the image representing the space through which the target object passes with the passage of time as the passage space image, the user can easily recognize a direction in which the target object moves with the passage of time in an arrangement of a plurality of target objects reflected in the 3D stroboscopic image.

As described above, the editing device 23 displays the editing screen including the 3D stroboscopic image and the animation curve linked with the 3D stroboscopic image. Thus, for example, since the animation curve changes in accordance with operation on the target object reflected in the 3D stroboscopic image, the free viewpoint image can be easily edited. That is, operability of editing the free viewpoint image is dramatically improved, and the editing efficiency can therefore be improved. Moreover, a new editing UI can be experienced by the user.

Furthermore, with the 3D stroboscopic image displayed on the editing screen, the user can view a temporal change of the target object and intuitively recognize, for example, a change (point) of a scene on the timeline. As a result, the user can easily find a frame in which an appropriate scene as a key frame is reflected, such as a decisive moment or another, and set the frame as the key frame.

Moreover, with the editing screen, the target object reflected in the key frame represented by the plurality of key points on the animation curve can be confirmed with the 3D stroboscopic image.

Furthermore, with the editing screen, the target object reflected in the 3D stroboscopic image displayed on the image display section 111 is moved by dragging or the like, whereby (the key point representing) the key frame can be intuitively changed.

Moreover, with the editing screen, the 3D stroboscopic image in which the angle and the zoom magnification are changed is displayed in accordance with the user's operation, and thus, the user can easily select the object of interest to be used for the operation such as the change of the key frame from the 3D stroboscopic image by setting the 3D stroboscopic image to a state in which the target object is easily visible.

Furthermore, on the editing screen, by performing association display in which the key point is associated with the target object reflected in the key frame represented by the key point, the user can intuitively recognize the target object on the 3D stroboscopic image corresponding to the key point on the animation curve.

Moreover, by displaying the 3D stroboscopic image on which the passage space image is superimposed on the editing screen, the user can easily confirm whether the objects to be combined interfere with each other or adjust the timing of synthesizing the objects so that the objects do not interfere with each other.

<Description of Computer to which the Present Technology is Applied>

Next, a series of processing described above can be performed by hardware or software. In a case where the series of processing is performed by software, a program constituting the software is installed in a general-purpose computer or the like.

Figure 20:
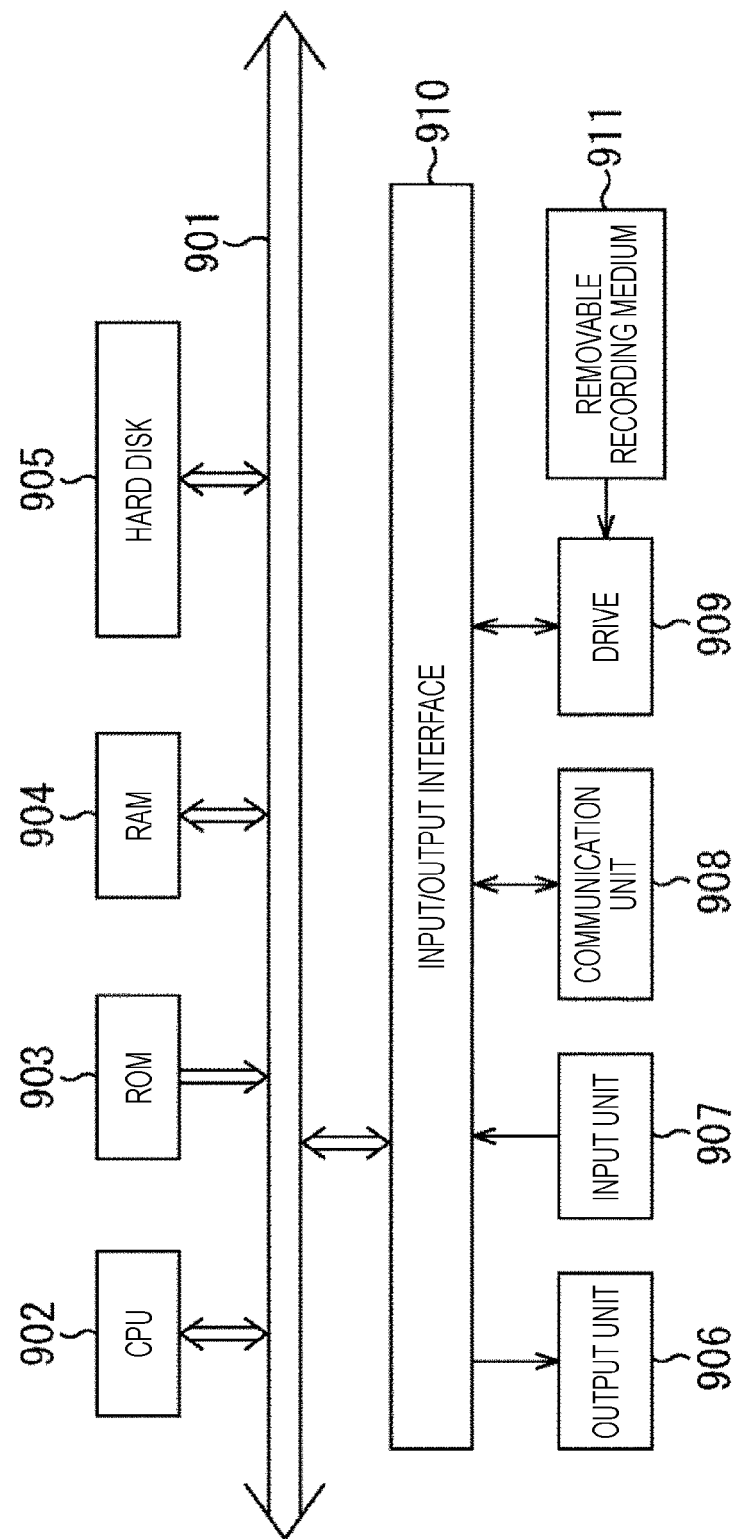
FIG. 20 is a block diagram illustrating a configuration example of an embodiment of a computer to which the present technology is applied.

FIG. 20 is a block diagram illustrating a configuration example of an embodiment of a computer in which a program for executing the series of processing described above is installed.

The program can be recorded in advance on a hard disk 905 or a ROM 903 as a recording medium incorporated in the computer.

Alternatively, the program can be stored (recorded) in a removable recording medium 911 driven by a drive 909. Such a removable recording medium 911 can be provided as so-called packaged software. Here, examples of the removable recording medium 911 include a flexible disk, a Compact Disc Read Only Memory (CD-ROM), a Magneto Optical (MO) disk, a Digital Versatile Disc (DVD), a magnetic disk, a semiconductor memory, and the like.

Note that, the program can be installed on the computer from the removable recording medium 911 as described above, or can be downloaded to the computer via a communications network or a broadcast network and installed on the hard disk 905 incorporated. In other words, for example, the program can be wirelessly transferred from a download site to the computer via an artificial satellite for digital satellite broadcasting, or can be transmitted to the computer via a network such as a Local Area Network (LAN) or the Internet by wire.

The computer incorporates a Central Processing Unit (CPU) 902, and an input/output interface 910 is connected to the CPU 902 via a bus 901.

The CPU 902 executes the program stored in the Read Only Memory (ROM) 903 according to a command when the command is input by a user operating an input unit 907 or the like via the input/output interface 910. Alternatively, the CPU 902 loads the program stored in the hard disk 905 into a random access memory (RAM) 904 and executes the program.

The CPU 902 therefore performs the processing according to the above-described flowchart or the processing performed by the configuration of the above-described block diagram. Then, the CPU 902 causes the processing result to be output from an output unit 906 or transmitted from a communication unit 908 via the input/output interface 910 as necessary, and further, recorded on the hard disk 905, for example.

Note that, the input unit 907 includes a keyboard, a mouse, a microphone, and the like. Furthermore, the output unit 906 includes a Liquid Crystal Display (LCD), a speaker, and the like.

Here, in the present specification, the processing performed by the computer in accordance with the program does not necessarily have to be performed chronologically in the order described as the flowchart. In other words, the processing performed by the computer in accordance with the program also includes processing executed in parallel or individually (for example, parallel processing or processing by an object).

Furthermore, the program may be processed by one computer (processor) or may be subjected to distributed processing by a plurality of computers. Moreover, the program may be transferred to a remote computer and executed.

Moreover, in the present specification, a system means a set of a plurality of constituents (device, module (component), and the like), and it does not matter whether or not all of the constituents are in the same cabinet. Thus, a plurality of devices that is accommodated in a separate cabinet and connected to each other via a network and one device that accommodates a plurality of modules in one cabinet are both systems.

Note that, the embodiment of the present technology is not limited to the embodiments described above, and various modifications are possible without departing from the scope of the present technology.

For example, the present technology can adopt a configuration of cloud computing that shares one function in a plurality of devices via a network to perform processing in cooperation.

Furthermore, each step described in the above flowchart can be executed by sharing in a plurality of devices, other than being executed by one device.

Moreover, in a case where a plurality of pieces of processing is included in one step, the plurality of pieces of processing included in the one step can be executed by sharing in a plurality of devices, other than being executed by one device.

Furthermore, the advantageous effects described in the present specification are merely examples and are not limited to them, and other effects may be included.

Note that, the present technology can have the following configurations.

<1>
An image processing device including
a display control unit that displays:
a 3D stroboscopic image obtained by imaging, with a virtual camera, a stroboscopic model in which 3D models of an object at a plurality of times generated from a plurality of viewpoint images imaged from a plurality of viewpoints are arranged in a three-dimensional space; and
an editing parameter to be edited in editing of a free viewpoint image obtained by imaging, with the virtual camera, free viewpoint data generated from the plurality of viewpoint images, the editing parameter being linked with the 3D stroboscopic image.
<2>
The image processing device according to <1>, in which
the display control unit displays an animation curve that is a temporal change of the editing parameter.
<3>
The image processing device according to <2>, in which
the stroboscopic model is generated by using at least a predetermined key frame among frames of the viewpoint images, and
the display control unit moves a key point representing the key frame on the animation curve in conjunction with movement of an object reflected in the key frame in the 3D stroboscopic image.
<4>
The image processing device according to <2> or <3>, further including a virtual camera setting unit that sets a camera parameter of the virtual camera.
<5>
The image processing device according to <4>, in which
in a case where an animation curve of the camera parameter of the virtual camera is displayed, the display control unit changes the animation curve to cause the camera parameter changed to be reflected in accordance with a change in the camera parameter of the virtual camera.
<6>
The image processing device according to <4> or <5>, in which
the camera parameter is an imaging position, an imaging posture, or a zoom magnification of the virtual camera.
<7>
The image processing device according to any of <2> to <6>, in which
the stroboscopic model is generated by using at least a predetermined key frame among frames of the viewpoint images, and
the display control unit displays an association display in which a key point representing the key frame on the animation curve is associated with an object reflected in the key frame represented by the key point among objects reflected in the 3D stroboscopic image.
<8>
The image processing device according to any of <1> to <7>, in which
the display control unit displays the 3D stroboscopic image on which a passage space image representing a space through which an object reflected in the 3D stroboscopic image passes is superimposed.
<9>
The image processing device according to <8>, in which
the passage space image is an image representing a space through which the object passes with passage of time.
<10>
An image processing method including
displaying:
a 3D stroboscopic image obtained by imaging, with a virtual camera, a stroboscopic model in which 3D models of an object at a plurality of times generated from a plurality of viewpoint images imaged from a plurality of viewpoints are arranged in a three-dimensional space; and
an editing parameter to be edited in editing of a free viewpoint image obtained by imaging, with the virtual camera, free viewpoint data generated from the plurality of viewpoint images, the editing parameter being linked with the 3D stroboscopic image.
<11>
A program for causing a computer to function as
a display control unit that displays:
a 3D stroboscopic image obtained by imaging, with a virtual camera, a stroboscopic model in which 3D models of an object at a plurality of times generated from a plurality of viewpoint images imaged from a plurality of viewpoints are arranged in a three-dimensional space; and
an editing parameter to be edited in editing of a free viewpoint image obtained by imaging, with the virtual camera, free viewpoint data generated from the plurality of viewpoint images, the editing parameter being linked with the 3D stroboscopic image.

REFERENCE SIGNS LIST

21 Imaging device
22 Content Server

23 Editing device
31 Free viewpoint data generation unit
32 Storage unit
33 Communication unit
41 Communication unit
42 Storage unit
43 Free viewpoint image generation unit
44 Display control unit
45 Display unit
46 Operation unit
47 Virtual camera setting unit
48 Editing parameter acquisition unit
49 Stroboscopic model generation unit
111 Image display section
112 Parameter display section
901 Bus
902 CPU
903 ROM
904 RAM
905 Hard disk
906 Output unit
907 Input unit
908 Communication unit
909 Drive
910 Input/output interface
911 Removable recording medium

The invention claimed is:

1. An image processing device, comprising:
at least one processor configured to:
control display of a 3D stroboscopic image obtained by capture of an image of a stroboscopic model with a virtual camera, wherein
the stroboscopic model includes 3D models of an object arranged at a plurality of times in a three-dimensional space, and
the 3D models are generated from a plurality of viewpoint images imaged from a plurality of viewpoints;
control display of an editing parameter to be edited in editing of a free viewpoint image of the stroboscopic model, wherein
the free viewpoint image is obtained from free viewpoint data generated from the plurality of viewpoint images, and
the display of the editing parameter comprises an animation curve that indicates a value of the displayed editing parameter linked with positions of the object in the 3D stroboscopic image at a plurality of time points; and
control display of a plurality of tags attached to the animation curve and the object in the 3D stroboscopic image, wherein
a same tag of the plurality of tags is attached to both the animation curve and the object in the 3D stroboscopic image at a respective time point of the plurality of time points.

2. The image processing device according to claim 1, wherein the animation curve is a temporal change of the editing parameter.

3. The image processing device according to claim 2, wherein the at least one processor is further configured to:
generate the stroboscopic model using a key frame among frames of the plurality of viewpoint images; and
move a key point representing the key frame on the animation curve in conjunction with movement of the object reflected in the key frame in the 3D stroboscopic image.

4. The image processing device according to claim 2, wherein the at least one processor is further configured to set a camera parameter of the virtual camera that images the stroboscopic model.

5. The image processing device according to claim 4, wherein in a case where the animation curve of the camera parameter of the virtual camera is displayed, the at least one processor is further configured to change the animation curve to cause the camera parameter changed to be reflected in accordance with a change in the camera parameter of the virtual camera.

6. The image processing device according to claim 4, wherein the camera parameter is one of an imaging position, an imaging posture, or a zoom magnification of the virtual camera.

7. The image processing device according to claim 2, wherein the at least one processor is further configured to:
generate the stroboscopic model using a key frame among frames of the plurality of viewpoint images; and
control display of an association display in which a key point representing the key frame on the animation curve is associated with the object reflected in the key frame represented by the key point among objects reflected in the 3D stroboscopic image.

8. The image processing device according to claim 2, wherein the at least one processor is further configured to control the display of the 3D stroboscopic image on which a passage space image representing a space through which the object reflected in the 3D stroboscopic image passes is superimposed.

9. The image processing device according to claim 8, wherein the passage space image is an image representing the space through which the object passes with passage of time.

10. An image processing method, comprising:
controlling display of a 3D stroboscopic image obtained by imaging, with a virtual camera, a stroboscopic model, wherein
the stroboscopic model includes 3D models of an object arranged at a plurality of times in a three-dimensional space, and
the 3D models are generated from a plurality of viewpoint images imaged from a plurality of viewpoints;
controlling display of an editing parameter to be edited in editing of a free viewpoint image of the stroboscopic model, wherein
the free viewpoint image is obtained from free viewpoint data generated from the plurality of viewpoint images, and
the display of the editing parameter comprises an animation curve that indicates a value of the displayed editing parameter is linked with positions of the object in the 3D stroboscopic image at a plurality of time points; and
controlling display of a plurality of tags attached to the animation curve and the object in the 3D stroboscopic image, wherein
a same tag of the plurality of tags is attached to both the animation curve and the object in the 3D stroboscopic image at a respective time point of the plurality of time points.

11. A non-transitory computer-readable medium having stored thereon computer-executable instructions, that when executed by a processor, cause the processor to execute operations, the operations:

controlling display of a 3D stroboscopic image obtained by imaging, with a virtual camera, a stroboscopic model, wherein
- the stroboscopic model includes 3D models of an object arranged at a plurality of times in a three-dimensional space, and
- the 3D models are generated from a plurality of viewpoint images imaged from a plurality of viewpoints;

controlling display of an editing parameter to be edited in editing of a free viewpoint image of the stroboscopic model, wherein
- the free viewpoint image is obtained from free viewpoint data generated from the plurality of viewpoint images, and
- the display of the editing parameter comprises an animation curve that indicates a value of the displayed editing parameter is linked with positions of the object in the 3D stroboscopic image at a plurality of time points; and controlling display of a plurality of tags attached to the animation curve and the object in the 3D stroboscopic image, wherein
- a same tag of the plurality of tags is attached to both the animation curve and the object in the 3D stroboscopic image at a respective time point of the plurality of time points.

12. The image processing device according to claim 1, wherein the at least one processor is further configured to control the display of the editing parameter concurrently with the display of the object in the 3D stroboscopic image at the plurality of time points.

* * * * *